United States Patent
Saeki et al.

(10) Patent No.: US 11,524,738 B2
(45) Date of Patent: Dec. 13, 2022

(54) SADDLE-RIDDEN VEHICLE

(71) Applicant: KAWASAKI MOTORS, LTD., Akashi (JP)

(72) Inventors: Daisuke Saeki, Kobe (JP); Hiroyuki Watanabe, Kobe (JP); Takeshi Nakajima, Kobe (JP); Shouta Matsuzaki, Kobe (JP); Mitsuru Kobayashi, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/309,772

(22) PCT Filed: Dec. 12, 2019

(86) PCT No.: PCT/JP2019/048601
§ 371 (c)(1),
(2) Date: Jun. 17, 2021

(87) PCT Pub. No.: WO2020/129789
PCT Pub. Date: Jun. 25, 2020

(65) Prior Publication Data
US 2022/0055706 A1    Feb. 24, 2022

(30) Foreign Application Priority Data

Dec. 21, 2018    (JP) .............................. JP2018-239349

(51) Int. Cl.
*B62J 6/04*    (2020.01)
*F21S 43/20*    (2018.01)
(Continued)

(52) U.S. Cl.
CPC ................. *B62J 6/04* (2013.01); *B62J 45/41* (2020.02); *F21S 43/26* (2018.01); *F21W 2103/20* (2018.01); *F21W 2107/13* (2018.01)

(58) Field of Classification Search
CPC ................................. B62J 45/41; F21S 43/26
See application file for complete search history.

(56) References Cited

U.S. PATENT DOCUMENTS

2013/0311075 A1    11/2013    Tran et al.
2014/0293629 A1*   10/2014    Otsuji ..................... F21S 43/14
                                                                  362/475
(Continued)

FOREIGN PATENT DOCUMENTS

CA             3087548    *  7/2020    .............. B62J 45/42
DE        102014213392        1/2016
(Continued)

*Primary Examiner* — Zheng Song
(74) *Attorney, Agent, or Firm* — Fay Kaplun & Marcin, LLP

(57) ABSTRACT

A motorcycle includes a tail lamp, a rear covering, rear end components which are a license plate and a license lamp, a rear stay, and a sensor. The tail lamp emits light toward the rear side. The rear covering is provided with the tail lamp. The rear end components are disposed more rearward than the rear covering. The rear stay extends at least rearward from a connecting portion connected to the rear covering and supports the rear end components. The sensor senses an object rearward is at least partially received in an internal space that is formed either in the rear covering or in the rear stay.

20 Claims, 15 Drawing Sheets

(51) Int. Cl.
  *B62J 45/41*      (2020.01)
  *F21W 103/20*     (2018.01)
  *F21W 107/13*     (2018.01)

(56) References Cited

U.S. PATENT DOCUMENTS

| | | | |
|---|---|---|---|
| 2017/0101147 A1* | 4/2017 | Hasegawa | ............ B60Q 1/346 |
| 2018/0148116 A1 | 5/2018 | Kurata | |
| 2021/0001945 A1* | 1/2021 | Hagimoto | ............... B62J 45/42 |
| 2021/0061391 A1* | 3/2021 | Yamashita | ............ H01Q 25/00 |

FOREIGN PATENT DOCUMENTS

| | | | | |
|---|---|---|---|---|
| EP | 2230163 A1 | | 9/2010 | |
| JP | S 61-162777 | | 7/1986 | |
| JP | 2009204592 A | | 9/2009 | |
| JP | 2010030471 A | | 2/2010 | |
| JP | 2010215054 A | | 9/2010 | |
| JP | 2012176697 A | | 9/2012 | |
| JP | WO 2014136658 | * | 2/2014 | ............ H01Q 21/29 |
| JP | 2016124376 A | | 7/2016 | |
| JP | 2017039487 A | | 2/2017 | |
| JP | WO 2019186945 | * | 3/2018 | ............ G01S 15/93 |
| JP | WO 2019186948 | * | 10/2019 | ............ B62J 45/42 |
| JP | WO 2019224957 | * | 11/2019 | ............ B62J 6/027 |
| WO | 2018/025231 | | 2/2018 | |
| WO | 2019/224959 A1 | | 11/2019 | |

\* cited by examiner

SADDLE-RIDDEN VEHICLE

TECHNICAL FIELD

The present invention mainly relates to a straddle vehicle including a sensor.

BACKGROUND ART

Patent Literature 1 (PTL 1) discloses a motorcycle including an obstruction detection device (sensor) that senses the rear side by using ultrasonic waves, radar waves, or the like. The obstruction detection device is externally attached to an upper surface of a rear cowl (rear covering) of the motorcycle.

CITATION LIST

Patent Literature

PTL 1: Japanese Patent Application Laid-Open No. 2009-204592

SUMMARY OF INVENTION

Technical Problem

The configuration of PTL 1, in which the obstruction detection device is externally attached to the rear cowl, leads to upsizing of a vehicle body. This issue is present not only in motorcycles but also in other straddle vehicles.

The present invention relates to a straddle vehicle to which a sensor is attached with prevention or suppression of upsizing of a vehicle body.

Solution to Problem

The problem to be solved by the present invention is as above. The following describes solutions to the problem as well as advantageous effects thereof.

An aspect of the present invention provides a straddle vehicle having the following configuration. The straddle vehicle includes a tail lamp, a rear covering, a rear end component, a rear stay, and a sensor. The tail lamp emits light toward the rear side. The rear covering is provided with the tail lamp. The rear end component is disposed more rearward than the rear covering. The rear stay extends at least rearward from a connecting portion connected to the rear covering, and supports the rear end component. The sensor is at least partially received in an internal space that is formed either in the rear covering or in the rear stay, and senses an object rearward.

Since the sensor is received in the internal space of the rear covering or of the rear stay, upsizing of a vehicle body can be prevented or reduced as compared to a configuration in which the sensor is attached to the outside of an exterior component such as the rear covering and the rear stay.

Advantageous Effects of Invention

The present invention can allow a sensor to be attached to a straddle vehicle, with prevention or suppression of upsizing of a vehicle body.

DETAILED DESCRIPTION

Hereinafter, embodiments of the present invention will be described with reference to the drawings. In the following descriptions, the left-right direction of a motorcycle 1, which is an example of a straddle vehicle, is defined based on the perspective of a driver riding on the motorcycle 1. Thus, the front-rear direction agrees with the vehicle length direction, and the left-right direction agrees with the vehicle width direction. The vertical direction (up-down direction) agrees with the height direction.

Figure 1:
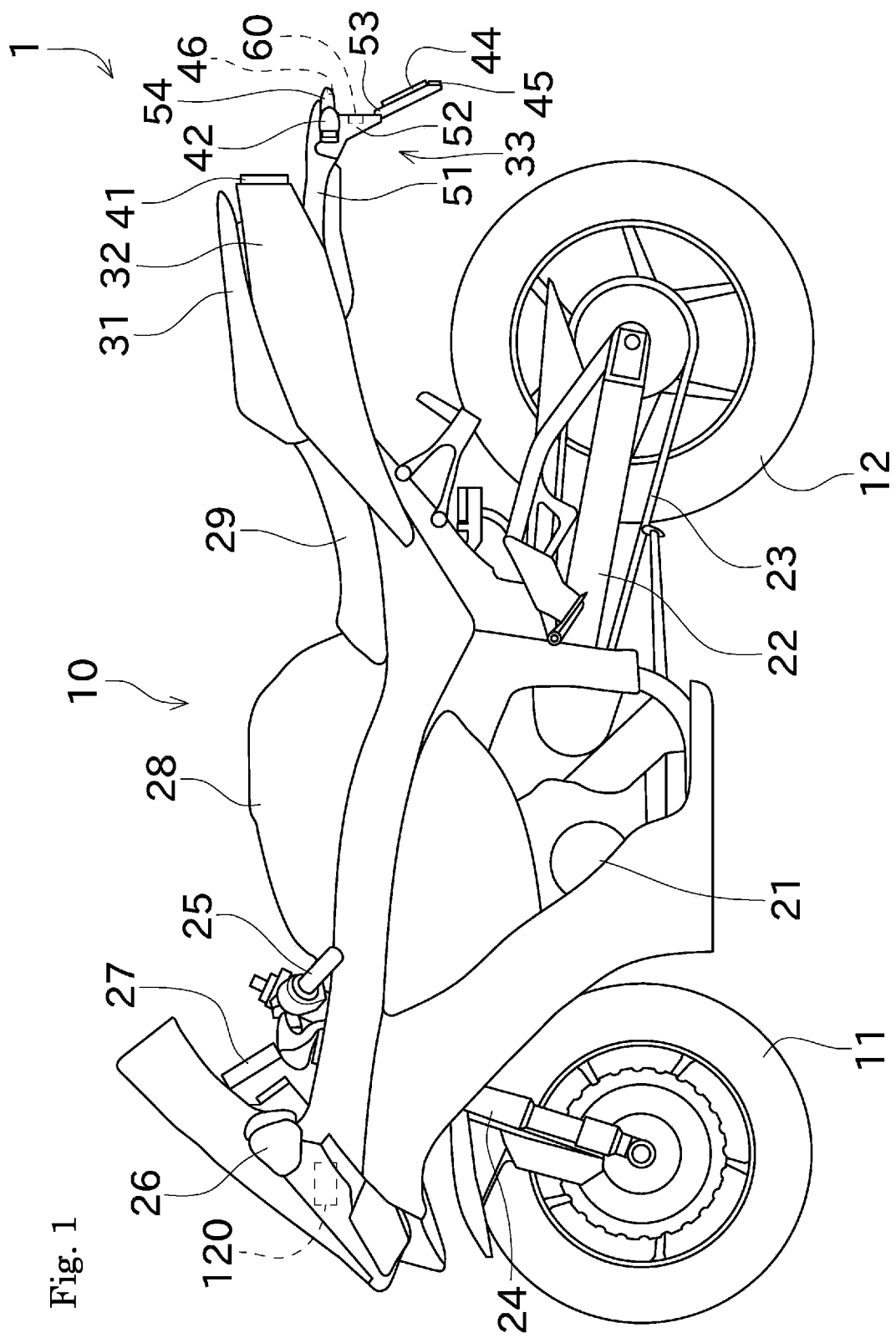
FIG. 1 shows a side view of a motorcycle according to a first embodiment of the present invention.
Figure 2:
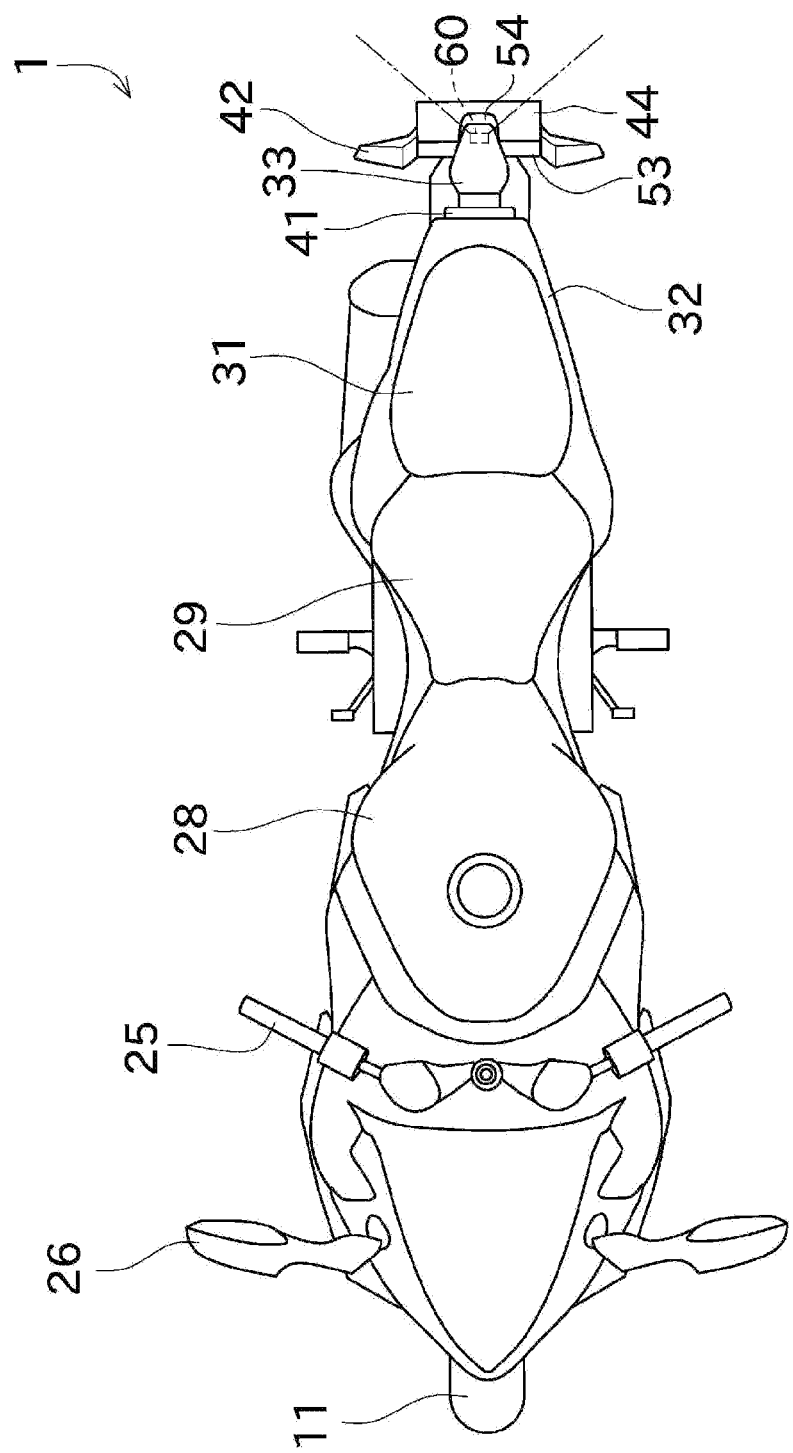
FIG. 2 shows a plan view of the motorcycle according to the first embodiment.
Figure 3:
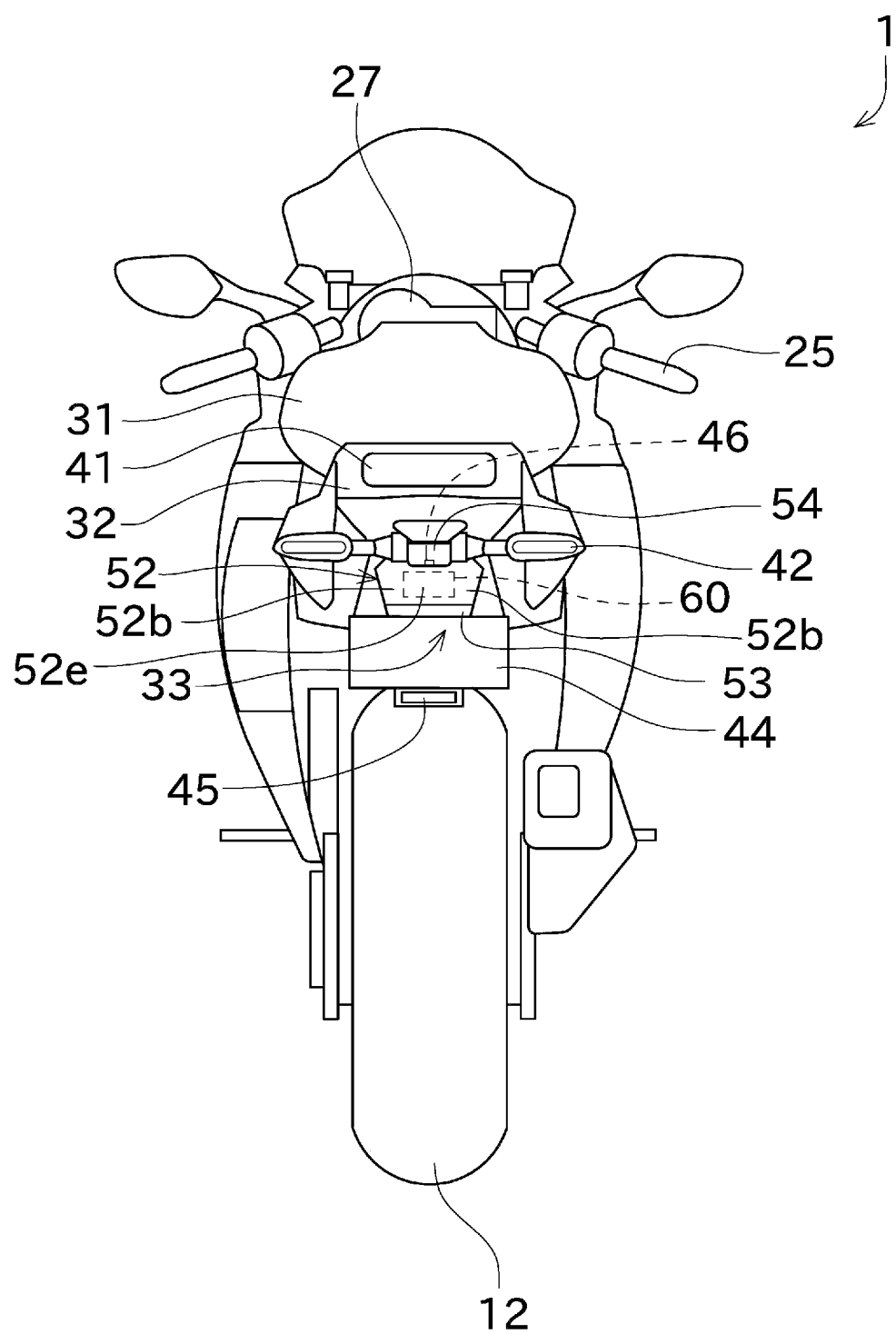
FIG. 3 shows a rear view of the motorcycle according to the first embodiment.

First, overview of the motorcycle 1 will be described with reference to FIG. 1 to FIG. 3. FIG. 1 is a side view of the motorcycle 1. FIG. 2 is a plan view of the motorcycle 1. FIG. 3 is a rear view of the motorcycle. Referring to FIG. 1, the motorcycle 1 includes a vehicle body 10, a front wheel 11, and a rear wheel 12.

The vehicle body 10 includes two or more frames that constitute a framework of the motorcycle 1. Attached to these frames are various components of the motorcycle 1 and a cowl serving as an exterior of the motorcycle 1. The cowl is made of a resin, and allows electromagnetic waves to pass therethrough. An engine 21 is disposed near the center of the vehicle body 10 with respect to the front-rear direction. The engine 21 is a driving source for making the motorcycle 1 travel. The engine 21 of this embodiment is a gasoline engine. Instead of or in addition to the gasoline engine, another driving source may be provided, such as an electric motor for traveling. An internal combustion engine different from the gasoline engine may be provided as a driving source.

A swing arm 22 is disposed in a rear portion of the vehicle body 10. The rear wheel 12 is rotatably attached to a rear portion of the swing arm 22. Power generated by the engine 21 is transmitted to the rear wheel 12 via a driving chain 23. This is how the motorcycle 1 can be caused to travel.

A front fork 24 is attached to a front portion of the vehicle body 10 via upper and lower brackets (not shown), etc. The front fork 24 is composed of a pair of left and right front forks 24, which are arranged with the front wheel 11 therebetween in a front view. A steering handle 25 is disposed near the upper end of the front fork 24. As the driver rotates the steering handle 25, the front fork 24 rotates, so that a traveling direction of the motorcycle 1 can be changed.

A pair of left and right side mirrors 26 are disposed more frontward than the steering handle 25. The side mirrors 26 may be attached at another position (for example, at the steering handle 25). A meter device 27 is disposed near the center in the vehicle width direction and more frontward than the steering handle 25. The meter device 27 is capable of displaying an engine rotation speed, a vehicle speed, and other types of information.

A fuel tank 28 in which a fuel to be supplied to the engine 21 is reserved is disposed more rearward than the steering handle 25 and more upward than the engine 21. A front seat 29 for the driver to sit thereon is disposed more rearward than the fuel tank 28. The driver, while sitting on the front seat 29, holds the fuel tank 28 and therebelow between knee portions of his/her legs to stabilize his/her body, and shifts his/her weight to left or right, thereby performing a part of a steering operation or a vehicle-body lean operation.

Figure 4:
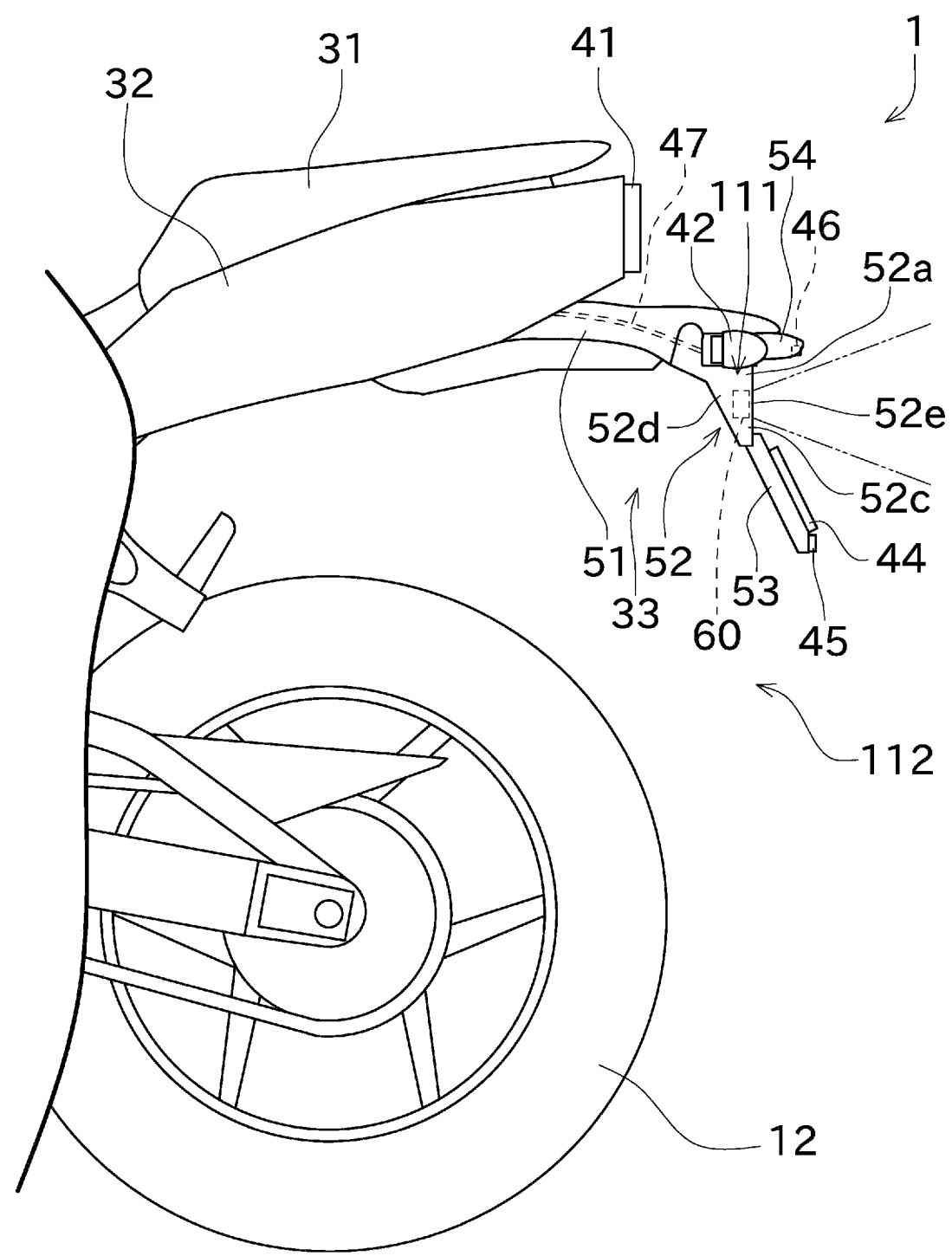
FIG. 4 shows an enlarged side view of the motorcycle according to the first embodiment.

Next, referring to FIG. 1 to FIG. 4, a configuration of a rear portion of the motorcycle 1, and especially a configuration for detecting an object that exists on the rear side, will be described. FIG. 4 is an enlarged side view of the motorcycle.

As shown in FIG. 1 and FIG. 4, etc., the motorcycle 1 includes a rear seat 31, a rear covering 32, and a rear stay 33.

The rear seat 31 is a seat for a fellow passenger to sit thereon. The rear seat 31 is disposed at a position more rearward than the front seat 29, the position being higher than the front seat 29. The rear seat 31 may be omitted.

Disposed inside the rear covering 32 is a rear frame. The rear covering 32 is arranged so as to cover a left side surface, a right side surface, and a lower surface of the rear frame. The rear covering 32 is made of a resin material. The rear frame is provided for the purpose of supporting the front seat 29 as well as vehicle body components that are disposed more rearward than the front seat 29. In this embodiment, the rear frame is made of a metal material. The rear covering 32 does not cover a predetermined portion of an upper surface of the rear frame so that the predetermined portion is opened, but the predetermined portion is covered with the rear seat 31. Here, a configuration may be possible in which, for example, electrical equipment, a harness, a tool box, and the like, all of which are not shown, can be attached below the rear seat 31.

A tail lamp 41 emits light toward the rear side of the vehicle body. The tail lamp 41 is a lamp configured to be turned on for informing a vehicle behind of the presence of the own vehicle equipped with the tail lamp 41, or to be turned on when a brake is applied. The tail lamp 41 is disposed in a rear portion of the rear covering 32. To be specific, a rear surface of the rear covering 32 has a through hole. The tail lamp 41 is configured to be partially exposed via the through hole. Thus, the rear covering 32 covers the rest portion of the tail lamp 41, which is a portion of the tail lamp 41 except the exposed portion. In this manner, the tail lamp 41 is provided so as to be partially received in the rear covering 32. Although the tail lamp 41 of this embodiment includes only one tail lamp 41 disposed at the center in the vehicle width direction, the tail lamp 41 may be configured otherwise.

The rear stay 33, which is connected to the rear covering 32, extends at least rearward from a connecting portion connected to the rear covering 32. Here, "extending at least rearward" means that a direction in which the rear stay 33 extends includes the rearward direction, and the direction in which the rear stay 33 extends may further include other directions (e.g., the downward direction). The rear stay 33 supports rear end components which will be described later. The rear stay 33 has a function as a rear fender (mudguard), too. The rear stay 33 is configured to be attachable to the rear covering 32 or the rear frame with a bolt or the like, for example. In other words, the rear covering 32 and the rear stay 33 are separate members that can be attached to and detached from each other. A configuration in which the rear stay 33 and the rear covering 32 can be attached to and detached from each other includes not only a configuration in which the rear stay 33 and the rear covering 32 can be attached while being in contact with each other but also a configuration in which they can be attached to and detached from each other via another member (e.g., the rear frame or a predetermined attachment member). The rear stay 33 may be made of a resin, a metal, or a combination of a resin and a metal. Adopting the combination of a resin and a metal in such a manner that a core part is made of a metal while a part covering the core part or another component is made of a resin can reduce vibration while suppressing the weight of the rear stay 33.

The rear stay 33 includes a stay extending-out portion 51, a stay rear end portion 52, a license plate attachment portion 53, and a license lamp attachment portion 54. The license plate attachment portion 53 and the license lamp attachment portion 54 correspond to a projecting portion that projects more rearward than a rear surface of a sensor 60.

The stay extending-out portion 51 extends rearward from the connecting portion connected to the rear covering 32. The stay rear end portion 52 is continuous with the rear end of the stay extending-out portion 51, and extends from the rear end of the stay extending-out portion 51, in downward direction relative to the direction in which the stay extending-out portion 51 extends. The rear stay 33 of this embodiment is configured such that its extending direction largely changes due to a difference between the direction in which the stay extending-out portion 51 extends and the direction in which the stay rear end portion 52 extends. The point of the change can serve as a boundary that separates the rear stay 33 into the stay extending-out portion 51 and the stay rear end portion 52. In this embodiment, the stay extending-out portion 51 extends downward toward the rear. The stay rear end portion 52, on the other hand, extends vertically downward from the rear end of the stay extending-out portion 51.

Here, even when the rear stay 33 is configured such that its extending direction does not largely change (for example, configured to have an arc shape with a constant curvature), it is possible that the rear stay 33 is separated into the stay extending-out portion 51 and the stay rear end portion 52 at an appropriate position (a position at which the angle of the extending direction is equal to or greater than a predetermined value).

In this embodiment, the stay rear end portion 52 has a rear wall 52e facing the rear side. In detail, the rear wall 52e is formed as a vertical wall perpendicular to the front-rear direction. The stay rear end portion 52 has at least side walls 52b and a top wall 52a. The side walls 52b are respectively continuous with both side portions of the rear wall 52e in the vehicle width direction. The top wall 52a is continuous with an upper portion of the rear wall 52e. In this embodiment, the stay rear end portion 52 further includes a lower wall 52c and a front wall 52d. These walls define a reception space (internal space 111) for receiving the sensor 60, as will be described later. The license plate attachment portion 53, which is continuous with the lower end of the stay rear end portion 52, is configured to be capable of supporting a license plate 44. In this embodiment, the license plate attachment portion 53 has an inclined surface that extends from a connecting portion connected to the stay rear end portion 52, the inclined surface being inclined to be more downward as it goes more rearward. The license plate 44 is disposed along the inclined surface. The inclined surface is preset so as to have an inclination angle suitable to present the license plate 44.

The license lamp attachment portion 54 is formed so as to be capable of supporting a license lamp 46. The license lamp attachment portion 54 is located more upward than the license plate attachment portion 53, and in this embodiment, is connected to the stay rear end portion 52. The license lamp attachment portion 54 is continuous with an upper portion of the stay rear end portion 52. Consequently, the license lamp attachment portion 54 and the license plate attachment portion 53 are arranged at an interval in the up-down direction. The rear wall 52e of the stay rear end portion 52 is located between the license lamp attachment portion 54 and the license plate attachment portion 53.

Attached to the rear stay 33 are a rear turn lamp 42, the license plate 44, a rear reflector 45, the license lamp 46, a rear harness 47, and the sensor 60. The license plate 44, the rear reflector 45, and the license lamp 46 are an exemplification of the rear end components that are disposed more rearward than the rear covering 32. Thus, a part of the foregoing components may be omitted from the rear end components, or other components may be added to the rear end components.

The rear turn lamp 42 comprises a pair of left and right rear turn lamps 42 attached to the rear stay 33. More specifically, the rear turn lamps 42 are attached to the license lamp attachment portion 54 or to a rear portion of the license lamp attachment portion 54. The rear turn lamps 42 blink in accordance with the driver's operation at a time of right turning, left turning, lane changing, and the like. The rear turn lamps 42 may be used as a hazard lamp.

The license plate 44 and the rear reflector 45 are attached to the license plate attachment portion 53. The license plate attachment portion 53 is disposed at the center in the vehicle width direction. In this embodiment, the license plate attachment portion 53 is configured such that both upper and lower portions of the license plate 44 can be attached thereto. Instead, it may be acceptable that only the upper portion of the license plate 44 can be attached.

The rear reflector 45 is disposed below the license plate 44 in the license plate attachment portion 53. The rear reflector 45 is a member that reflects light emitted from the rear side toward the rear reflector 45. In this embodiment, the license plate 44 in an inclined posture is attached to the license plate attachment portion 53 as described above, while the rear reflector 45 is attached to the license plate attachment portion 53 such that a reflecting surface of the rear reflector 45 extends in parallel with the vertical plane. For example, the rear reflector 45 has a retroreflective function to reflect light back toward an emission source.

The license lamp 46 is attached to the license lamp attachment portion 54. The license lamp attachment portion 54, which is disposed at the center of the stay rear end portion 52 in the vehicle width direction, extends further rearward from the above-mentioned vertical plane. The license lamp attachment portion 54 has an internal space in which the license lamp 46 is received. The license lamp 46 emits light at least in the downward direction, to illuminate the license plate 44. For example, the license plate 44 (license plate attachment portion 53) and the license lamp 46 (license lamp attachment portion 54) overlap each other in a plan view. Preferably, the license plate 44 is disposed at a position lower than the license lamp 46.

The rear harness 47 is a bundle of harnesses used to supply electric power to electrical equipment attached to the rear stay 33 (in this embodiment, to the rear turn lamps 42, the license lamp 46, and the sensor 60) and to communicate with the electrical equipment. The rear harness 47 extends through the inside of the rear stay 33, and is connected to a battery (not shown) or to a control device 120 which will be described later. Since the harnesses for two or more electrical equipment are collectively handled in this manner, a work of routing the harnesses is easy. Especially in a case of adding the sensor 60 to the existing motorcycle 1, it is not necessary to newly provide a portion through which a harness for the sensor 60 passes. The rear harness 47, if waterproofed, may be configured to extend at the outside of the rear stay 33.

The sensor 60 senses an object rearward of the motorcycle 1. For example, the sensor 60 is a radar device, a sonar, or a camera. The radar device transmits electromagnetic waves (infrared rays, millimeter waves, or microwaves, etc.) toward the rear side, and acquires reflected waves (electromagnetic waves) reflected by the object, to thereby detect a direction in which the object is present and a distance to the object. The sonar transmits ultrasonic waves toward the rear side, and acquires reflected waves (ultrasonic waves) reflected by the object, to thereby detect a direction in which the object is present and a distance to the object. The camera acquires an image of the object rearward of the motorcycle 1. The camera subjects the image to image processing, and thereby can sense the object rearward. In this manner, the sensor 60 can be implemented by using an existing configuration. In this embodiment, the sensor 60 is implemented by a radar device.

The sensor 60 has a sensing range that starts from the rear surface of the sensor 60 and spreads wider in the up-down direction and in the vehicle width direction as it goes farther rearward. In this embodiment, the sensor 60 is provided as a single unit, and this single sensor 60 senses an object within a range from the rear left side to the rear right side of the motorcycle 1. In this embodiment, the sensing range in the vehicle width direction is wider than the sensing range in the up-down direction. The sensor 60 intermittently acquires a sensing result by sensing the rear side at short time intervals. The sensor 60 transmits the sensing result to the control device 120 by wire (the rear harness 47) or wirelessly.

In this embodiment, the control device 120 includes an arithmetic unit, a storage device, and the like, and controls respective parts of the motorcycle 1 based on the sensing result from the sensor 60. The control device 120 may be configured to perform only a control based on the sensing result from the sensor 60, or may be configured to further perform other controls. Although this embodiment illustrates the control device 120 disposed in a front portion (in a front cowl) of the motorcycle 1, the control device 120 may be disposed at another position (for example, below the front seat 29).

The control device 120 performs, for example, at least either one of a notification control or a travel control based on the sensing result from the sensor 60. The notification control is related to giving a notification to the driver. The travel control is related to traveling of the motorcycle 1. The notification control is a control for notifying the driver of information obtained from the detection result from the sensor 60, the information being exemplified by the distance to the object, the direction or lane in which the object is present, the relative speed of the object, and the like, which are detected by the sensor 60. Examples of how to give the notification to the driver include causing the meter device 27 to display notification contents, causing a predetermined portion of the side mirrors 26 to light up, and giving a voice sound through a speaker provided to the motorcycle 1 or a speaker built in a helmet of the driver. The travel control is a control for changing the traveling direction of the motorcycle 1 or increasing/decreasing the speed of the motorcycle 1 based on, for example, the relative distance and relative speed between the object and the motorcycle 1 detected by the sensor 60.

The control device 120 may be configured to perform another control instead or in addition to the notification control and the travel control. For example, if vehicle-to-vehicle communication is allowed, the control device 120 may transmit the sensing result to a vehicle that is approaching from the rear side. The control device 120 may perform a control of storing the sensing result from the sensor 60 (for example, an image acquired by the camera) in the storage device, instead of controlling the motorcycle by using the sensing result. In such a case, it is possible that the sensor 60 and the control device 120 are integrated like a general event data recorder.

A structure for attaching the sensor 60 will now be described in detail.

The sensor 60 is received in the internal space 111 formed in the stay rear end portion 52. Although this embodiment illustrates the internal space 111 formed only in the stay rear end portion 52 of the rear stay 33, it may be possible that the internal space 111 is formed to extend in both the stay extending-out portion 51 and the stay rear end portion 52. In this embodiment, the sensor 60 has a substantially rectangular parallelepiped shape. More specifically, the size of the internal space 111 is smaller in the thickness direction than in the other directions, namely, in the longer-side direction and in the shorter-side direction. Accordingly, the sensor 60 is in the shape of a rectangular plate. The sensor 60 has a sensor surface that acquires information for sensing, the sensor surface being formed on one of the sides in the thickness direction.

While the sensor 60 is received in the internal space 111 of the rear stay 33, the sensor surface of the sensor 60 is a rear surface facing the rear side of the vehicle body. In this embodiment, the sensor 60 is arranged such that its dimension in the longer-side direction extends in the vehicle width direction, its dimension in the shorter-side direction extends in the up-down direction, and its dimension in the thickness direction extends in the front-rear direction. As described above, side surfaces of the sensor 60, which are surfaces facing toward the vehicle width direction, are covered with the side walls 52*b* of the stay rear end portion 52. An upper surface of the sensor 60 is covered with the top wall 52*a* of the stay rear end portion 52. Here, in a case where the rear wall 52*e* of the stay rear end portion 52 is made of a material that allows electromagnetic waves to pass therethrough, it is preferable that the rear surface, which serves as the sensor surface, of the sensor 60 is covered with the rear wall 52*e* of the stay rear end portion 52. This can prevent or reduce a damage to the sensor surface. In a case where the rear wall 52*e* is made of a material that cannot easily allow electromagnetic waves to pass therethrough, an opening through which the sensor surface is exposed is formed in the rear wall 52*e* of the stay rear end portion 52.

It is preferable that a lower surface and a front surface of the sensor 60 are also covered with walls (i.e., the lower wall 52*c* and the front wall 52*d*) provided to the stay rear end portion 52. In such a configuration, all of the six surfaces of the sensor 60 including the sensor surface, or all of the five surfaces of the sensor 60 excluding the sensor surface are covered with the corresponding walls of the stay rear end portion 52. More specifically, the six surfaces or the five surfaces of the sensor 60 face corresponding wall portions of the stay rear end portion 52. Thus, in this embodiment, the internal space 111 is a space surrounded by six or five wall portions of the stay rear end portion 52. In a case where the internal space 111 is formed in a place other than the stay rear end portion 52, corresponding wall portions may be formed in a place other than the stay rear end portion 52. At least one wall portion has an attachment hole for receiving insertion of a fixture used to attach the sensor 60 to the stay rear end portion 52 in a detachable manner.

Since many of the surfaces of the sensor 60 are covered with the wall portions, the sensor 60 can be protected from mud, dirt, stones, and water (hereinafter, mud, etc.). Especially in a lower space 112 below the rear stay 33, which is a space where the rear wheel 12 is disposed, there is much mud, etc. splashed up by the rear wheel 12. Accordingly, providing the lower wall 52*c* that covers the lower surface of the sensor 60 can favorably protect the sensor 60 from mud, etc.

Moreover, it is preferable that one or more wall portions of the stay rear end portion 52 is/are in contact with the surface(s) of the sensor 60. This allows the sensor 60 to be held stably, and thus can suppress rattling of the sensor 60 when vibrating. At least one of the wall portions may not always need to be in contact with the sensor 60. In this embodiment, a portion where the sensor 60 is attached is configured such that at least half of the length of the stay rear end portion 52 in the vehicle width direction is occupied by the sensor 60 while the left and right side walls 52*b* are disposed in the rest of the length. This can enhance the rigidity of the stay rear end portion 52 and the sensor 60.

If at least one (e.g., the front wall 52*d*) of the wall portions is made of a metal, heat dissipation of the sensor 60 can be made. Especially when the core part of the rear stay 33 is made of a metal, the heat dissipation effect can be further enhanced by connection of the wall portion made of the metal to the core made of the metal.

In this embodiment, the rear stay 33 has wall portions each covering each of the six or five surfaces of the sensor 60. The number of wall portions of the rear stay 33 (in other words, the number of surfaces of the sensor 60 that are covered) may be four or less, so long as at least a part of the sensor 60 is covered and the internal space 111 for receiving the sensor 60 is provided. Any of the wall portions can be omitted. For example, the lower wall 52*c* and the front wall 52*d* may be omitted if a structure for preventing or reducing mud, etc. adhering to the sensor surface is separately provided.

In this embodiment, the sensor 60 is configured as a single unit that integrates a sensor part with a processing part (a control circuit and a power circuit, etc.) for analyzing information acquired by the sensor to identify an object that is close to the rear side of the own vehicle. This configuration can be more easily mounted to the vehicle body than a configuration having a sensor part and a processing part as separate members. In this embodiment, an electric wire that electrically connects the sensor 60 to the control device 120 and an electric wire that electrically connects the sensor 60 to an electric power source extend from the sensor 60 in a direction (the up-down direction or the vehicle width direction) perpendicular to the front-rear direction. For example, these electric wires extend below the sensor 60. Arranging these electric wire to extend in a lower place allows the sensor 60 to be arranged as high as possible while preventing or reducing interference of the sensor 60 with the electric wires.

The position at which the sensor 60 is attached will now be described in detail. Herein, the wording "disposed below (lower than)" or the like is intended to represent the positional relationship with focus on positioning in the up-down direction alone, and includes not only a state of being disposed right above or right below but also a state of being disposed obliquely above or obliquely below. The same is true for other directions.

The sensor 60 is disposed lower than the tail lamp 41, the connecting portion that connects the rear covering 32 to the rear stay 33, the rear turn lamps 42, the license lamp 46, and the license lamp attachment portion 54, and upper than the license plate 44, the rear reflector 45, and the license plate attachment portion 53.

Since the sensor 60 is disposed lower than the rear turn lamps 42 (more specifically, disposed so as not to overlap the rear turn lamps 42 in a side view), interference between the sensing range of the sensor 60 and the rear turn lamps 42 can be prevented or reduced. The license lamp 46 is disposed at a position far from the license plate 44 in order that the license lamp 46 can emit light over a wide range of the license plate 44. Thus, a space between the license plate 44 and the license lamp 46 can be used to arrange the sensor 60. The sensor 60 disposed too close to the license lamp 46 (license lamp attachment portion 54) could cause interference between the sensing range of the sensor 60 and the license lamp 46. The sensor 60 of this embodiment, therefore, is disposed below and at a distance from the license lamp 46. Preferably, the sensor 60 is arranged such that the center of the sensor 60 (or the transmission axis in a case of the sensor 60 configured to transmit ultrasonic waves or electromagnetic waves) is positioned lower than the center in the up-down direction of the space between the license lamp 46 and the license plate 44. This makes it less likely that the license lamp 46 interferes with the sensing range of the sensor 60.

The sensor 60 is disposed more rearward than the tail lamp 41. The sensor 60 is disposed near the rear end components, which are provided to the rear end of the rear stay 33. To be specific, the sensor 60 is disposed such that its position overlaps the position of the rear turn lamps 42 with respect to the front-rear direction. The sensor 60 is disposed slightly more frontward than the license plate 44, the rear reflector 45, the license lamp 46, the license plate attachment portion 53, and the license lamp attachment portion 54. In this embodiment, among parts of the vehicle body 10, only the rear stay 33 is positioned more rearward than the tail lamp 41. The sensor 60, which is attached to the rear stay 33, is therefore more rearward than most of the vehicle body 10. The rear end components provided to the rear end of the rear stay 33 are arranged at positions close to the sensor 60 with respect to the front-rear direction. This can make interference less likely to occur between the sensing range of the sensor 60 and other components, or can reduce time and labor of considering and devising a layout of other components so as not to cause interference between the sensing range of the sensor 60 and the other components.

If the sensor 60 is positioned most rearward, the sensor 60 is easily damaged by a collision with an object coming from the rear side. Moreover, the sensor 60 may be stained with mud, etc. flying from the obliquely upper rear side or from the obliquely lower rear side, and consequently the sensing ability may deteriorate. In this embodiment, the license plate attachment portion 53 (projecting portion), the license plate 44, and the license lamp attachment portion 54 (projecting portion) are disposed more rearward than the sensor 60, so that the sensor 60 is not easily damaged by a collision with an object coming from the rear side. Especially, on both the upper and lower sides of the sensor 60, other components are disposed more rearward than the sensor 60. Thus, the sensor 60 is not easily stained with mud, etc. flying from both the obliquely upper rear side and the obliquely lower rear side. Even when installation of the license plate 44 and the license lamp 46 is not necessary, it is preferable that a similar projecting portion is provided, from the viewpoint of protecting the sensor 60.

The sensor 60 of this embodiment is disposed at the center of the vehicle body in the vehicle width direction. The opposite end portions of the rear turn lamps 42 in the vehicle width direction are located such that their positions in the up-down direction are close to the upper surface of the sensor 60 while their positions in the vehicle width direction are more outward than the sensor 60. Thus, the sensor 60 is at least partially or entirely disposed between the pair of left and right rear turn lamps 42. The opposite end portions of the license plate 44 in the vehicle width direction are located such that their positions in the up-down direction are close to the lower surface of the sensor 60 while their positions in the vehicle width direction are more outward than the sensor 60. With this configuration, if an obstruction comes from a lateral side of the vehicle body, the obstruction collides against the rear turn lamp 42 or the license plate 44. Direct collision of the obstruction against the sensor 60 can be prevented or suppressed.

When components are arranged on the obliquely rear left side and the obliquely rear right side of the sensor 60, the components are likely to interfere with the sensing range of the sensor 60. Here, the probability that mud, etc. will come flying from the left-right direction is low. Accordingly, no component of the motorcycle 1 is disposed on the obliquely rear left side and the obliquely rear right side of the sensor 60.

The sensor 60 is disposed at the center in the vehicle width direction (on the axis line of the rear stay 33). To be specific, the sensor 60 is disposed such that its position in the vehicle width direction is between the pair of left and right rear turn lamps 42 and overlaps the tail lamp 41, the license plate 44, the rear reflector 45, the license lamp 46, the license plate attachment portion 53, and the license lamp attachment portion 54. In this embodiment, the single sensor 60 is used to sense both left and right, and therefore arranging the sensor 60 at the center in the vehicle width direction allows well-balanced sensing of left and right.

The sensor 60 is disposed more frontward than the rear end of the license plate 44. This can make vibration less influential, as compared to when the sensor 60 is disposed more rearward than the rear end of the license plate 44. The stay rear end portion 52 has a connecting portion (the proximal end) connected to the stay extending-out portion 51, and an opposite end portion (the distal end, or the rear reflector 45). The sensor 60 is disposed closer to the proximal end relative to the midpoint between the proximal end and the distal end, and more specifically is disposed closer to the proximal end relative to the license plate attachment portion 53.

The sensor surface of the sensor 60 is disposed along the rear surface of the stay rear end portion 52, which extends vertically. Thus, the sensing range of the sensor 60 is equally widened upward and downward as it goes more rearward, so that an object rearward can be sensed easily. In some case, it may be preferable that upper and lower parts of a transmission range are different from each other depending on the height, the position, and the like, of an object that make sensing easy. In this case, the rear surface of the stay rear end portion 52 is inclined. This configuration is encompassed by the present invention. The sensor 60 is received in the rear stay 33 with its dimension in the up-down direction being smaller than its dimension in the vehicle width direction. Accordingly, the dimensions of the license plate 44 and the rear stay 33 in the up-down direction can be made small. Consequently, vibration occurring in the rear stay 33 can be suppressed. Since the dimension in the vehicle width direction is large, the stay rear end portion 52 can support the license plate 44 with an increased rigidity. In addition, the sensor 60 is arranged with its thickness direction being along the front-rear direction. With this configuration, the dimension of the side walls 52b of the stay rear end portion 52, which cover the side surfaces of the sensor 60, does not become large in the front-rear direction. This can facilitate a weight reduction.

Although this embodiment illustrates the rear reflector 45 disposed below the license plate 44, a configuration in which the rear reflector 45 is disposed at another position is encompassed by the present invention. For example, the rear reflector 45 may be disposed in a region within the stay rear end portion 52, the region excluding a rear wall region that faces the sensor surface. With this, the rear reflector 45 can be disposed at a position that is not influential to the sensor 60. Alternatively, the rear reflector 45 may be disposed in the tail lamp 41 or in the rear covering 32.

Although this embodiment illustrates a configuration in which the license lamp 46 and the rear turn lamps 42 are disposed upper than the sensor 60, another configuration may be acceptable. For example, at least one of the license lamp 46 or the rear turn lamps 42 may be disposed below the sensor 60.

A second embodiment will now be described with reference to FIG. 5 to FIG. 9. In the description below, for members identical or similar to those of the above-described embodiment, the same reference signs as those used in the above-described embodiment will be given on the drawings, and their explanation may be omitted. In the rear stay 33, the side close to the rear covering 32 (rear frame side) may be called "stay proximal side", and the opposite side which is close to the license plate 44 may be called "stay distal side". The direction along the rear stay 33 (the longer-side direction of the rear stay 33) will be called "stay longer-side direction".

Figure 5:
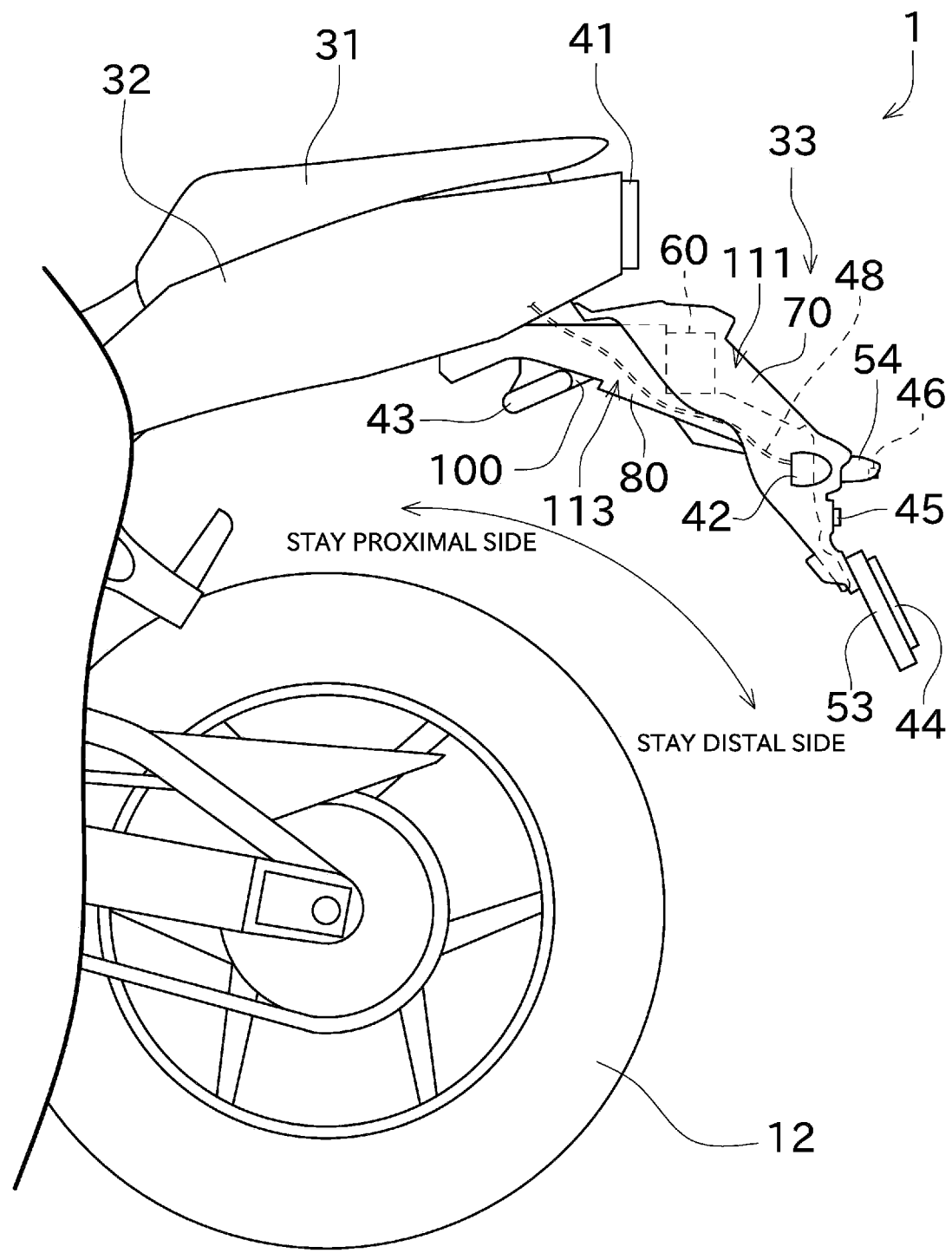
FIG. 5 shows an enlarged side view of a motorcycle according to a second embodiment according to the present invention.

The second embodiment is different from the first embodiment in terms of a structure of the rear stay 33. As shown in FIG. 5, the rear stay 33 of the second embodiment includes an upper covering 70, a stay main body 80, and a lower covering 100. The stay main body 80 has its upper surface partially covered with the upper covering 70. The stay main body 80 has its lower surface partially covered with the lower covering 100. The upper covering 70 has a shape with its lower side open, and this lower side is closed by the stay main body 80, so that a space (internal space 111) is formed between the upper covering 70 and the stay main body 80. The sensor 60 is disposed in this internal space 111. The stay main body 80 has a shape with its lower side open, and this lower side is closed by the lower covering 100, so that a space (auxiliary space 113) is formed between the stay main body 80 and the lower covering 100. Harnesses are disposed in the auxiliary space 113.

Examples of the harnesses disposed in the auxiliary space 113 include a lamp harness 48. The lamp harness 48 is a harness for supplying electric power to lamps (specifically, the rear turn lamps 42 and the license lamp 46) disposed in the rear stay 33, and for communicating with these lamps. In the same manner, a radar harness 61 connected to the sensor 60 is also disposed so as to extend through the auxiliary space 113 (a detailed configuration will be described later).

In the second embodiment, a radar device is provided as an example of the sensor 60. The upper covering 70, therefore, is made of a material that allows electromagnetic waves to pass therethrough. The material that allows electromagnetic waves to pass therethrough is generally a resin, and especially a resin containing neither a metal nor glass fibers (or containing a low percentage of them) is preferable. Such a material tends to have a low rigidity, however. To obtain a rigidity, the stay main body 80 is made of a material different from the material of the upper covering 70. The stay main body 80 is made of a resin containing a metal and glass fibers (a resin containing a higher percentage of them than the upper covering 70), or is made of a metal. Accordingly, the stay main body 80 has a higher rigidity than the upper covering 70. With this configuration, the low rigidity of the upper covering 70 can be compensated for by the stay main body 80.

A harness, which contains a metal, may hinder transmission and reception of electromagnetic waves by the sensor 60. In the second embodiment, the sensor 60 is disposed closer to the stay proximal side than the lamps disposed in the rear stay 33 are. Thus, the lamp harness 48 extending from these lamps toward the vehicle body needs to be arranged so as to avoid an electromagnetic-waves transmission range. Generally, the sensor 60 transmits electromagnetic waves over a wide range in the vehicle width direction and in the vehicle length direction. It therefore is difficult to arrange the lamp harness 48 so as to avoid the electromagnetic-waves transmission range. This is why in the second embodiment, the lamp harness 48 is disposed in the auxiliary space 113 which is a space different from the internal space 111.

Adoption of this configuration makes it possible that the sensor 60 is disposed closer to the stay proximal side than the lamps disposed in the rear stay 33 are. As a result, the sensor 60 is disposed on the stay proximal side having less vibration, and thus the amount of vibration transmitted to the sensor 60 can be reduced.

In the following, detailed structures of the upper covering 70, the stay main body 80, and the lower covering 100 will be described. First, the upper covering 70 will be described with reference to FIG. 6.

Figure 6:
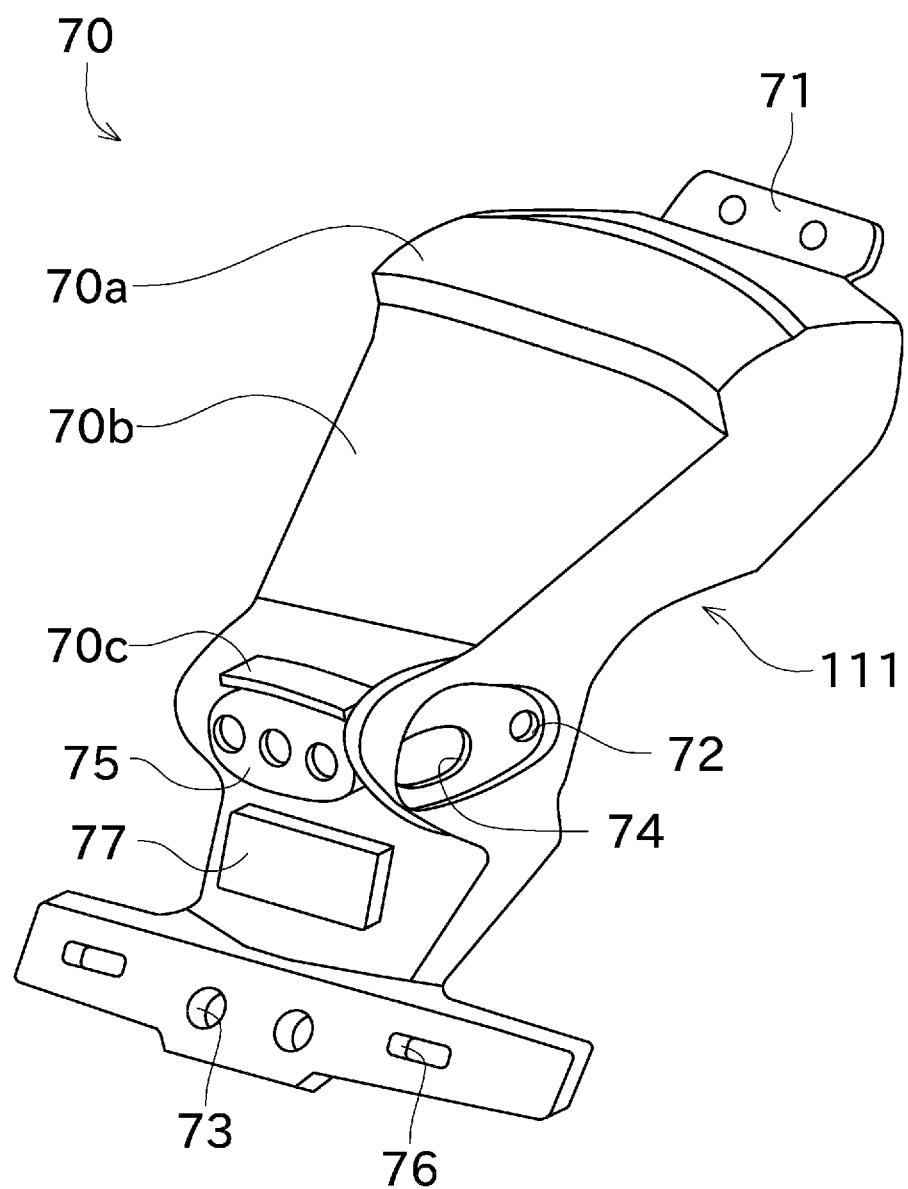
FIG. 6 shows a perspective view of an upper covering according to the second embodiment.

As shown in FIG. 6, the upper covering 70 includes a first coupling portion 71, a second coupling portion 72, and a third coupling portion 73. The first coupling portion 71 is formed in an end portion of the upper covering 70 on the stay proximal side. The second coupling portion 72 is formed in a middle portion of the upper covering 70 in the stay longer-side direction. The third coupling portion 73 is formed in an end portion of the upper covering 70 on the stay distal side. The first coupling portion 71, the second coupling portion 72, and the third coupling portion 73 are portions for coupling the upper covering 70 to the stay main body 80. While the upper covering 70 and the stay main body 80 can be coupled by any structure, it is preferable that they can be attached to and detached from each other. Allowing the upper covering 70 and the stay main body 80 to be attached to and detached from each other provides easy access to the internal space 111 at a time of maintenance, etc. The first coupling portion 71 and the second coupling portion 72 are different from each other in terms of coupling directions in which they are coupled to the stay main body 80. The coupling direction is, for example, an axial direction of a fixture, or a direction perpendicular to a contact surface between the upper covering 70 and the stay main body 80.

As shown in FIG. 6, the upper covering 70 includes a first attachment portion 74, a second attachment portion 75, a third attachment portion 76, and a fourth attachment portion 77. The first attachment portion 74 is a portion for attaching the rear turn lamps 42. In detail, the first attachment portion 74 is through holes, etc., in each of which a part of each rear turn lamp 42 is inserted. The second attachment portion 75 is a portion for attaching the license lamp 46. In detail, the second attachment portion 75 is a through hole for having the license lamp attachment portion 54 and the lamp harness 48 inserted therethrough. The third attachment portion 76 is a portion having substantially the same function as that of the license plate attachment portion 53 of the first embodiment. The fourth attachment portion 77 is a portion for attaching the rear reflector 45. The fourth attachment portion 77 is a flat surface to which the rear reflector 45 is to be adhered.

As shown in FIG. 6, the upper covering 70 is provided with a step portion 70a, a flat portion 70b, and a wall portion 70c. The step portion 70a is a step formed on a part of an upper surface of the upper covering 70, and from another viewpoint, is a projection that projects rearward. Due to the presence of the step portion 70a, the rigidity can be increased. Especially, the step portion 70a is disposed on the upper side and/or the rear side of the sensor 60, so that the sensor 60 can be stably protected. The flat portion 70b is a portion formed closer to the stay distal side than the step portion 70a. The flat portion 70b is a portion having none of a step, a projection, and a recess, etc., and therefore appropriately allows electromagnetic waves to pass therethrough. Since the flat portion 70b is formed at a position overlapping the sensor 60 in a rear view, the sensor 60 can appropriately transmit and receive radio waves. The wall portion 70c is a portion that projects outward (for example, rearward) of the upper covering 70, at a location above the second attachment portion 75. The wall portion 70c is a portion for concealing components (such as a harness, etc.) related to the license lamp 46 so that the components cannot be visible through the through hole of the second attachment portion 75.

In the second embodiment, a portion of the upper covering 70 close to the stay proximal side has a simple configuration, because the sensor 60 is disposed at a position close to the stay proximal side. On the other hand, in a portion of the upper covering 70 close to the stay distal side relative to the center in the stay longer-side direction, the above-described coupling portions and attachment portions (except the first coupling portion 71) are arranged collectively. As a result, both the sensing by the sensor 60 and arrangement of various components can be obtained. In the end portion of the upper covering 70 on the stay distal side, the third coupling portion 73 and the third attachment portion 76 are arranged side by side in the vehicle width direction. Since the third coupling portion 73 is coupled to the stay main body 80, the end portion of the upper covering 70 on the stay distal side is not easily bent. Accordingly, providing the third attachment portion 76 at this position can suppress vibration of the license plate 44 while allowing collective arrangement of the third coupling portion 73 and the third attachment portion 76.

Next, the stay main body 80 will be described with reference to FIG. 7 and FIG. 8.

Figure 7:
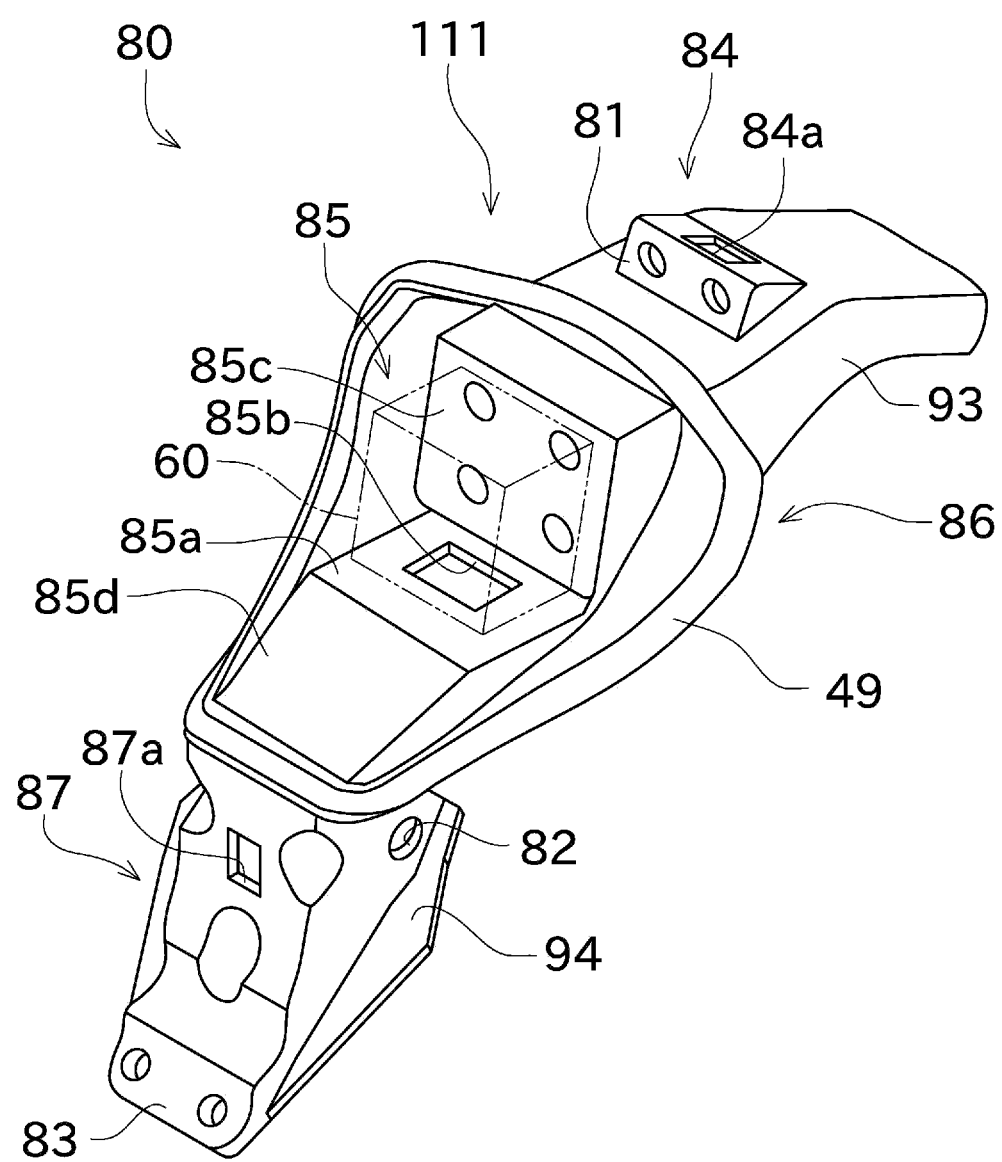
FIG. 7 shows a perspective view showing the upper side of a stay main body according to the second embodiment.

As shown in FIG. 7, the stay main body 80 has, on its upper surface side, a first upper coupling portion 81, a second upper coupling portion 82, and a third upper coupling portion 83. The first upper coupling portion 81 is a portion to be coupled to the first coupling portion 71. The second upper coupling portion 82 is a portion to be coupled to the second coupling portion 72. The third upper coupling portion 83 is a portion to be coupled to the third coupling portion 73.

The stay main body 80 further has, on its upper surface side, a proximal end portion 84, a radar arrangement portion 85, a sealing member arrangement portion 86, and a lamp arrangement portion 87.

The proximal end portion 84, which is a portion corresponding to an end portion on the stay proximal end side, is detachably attached to the rear covering 32 or to the rear frame with a fixture, etc. The proximal end portion 84 has an insertion hole 84a. More specifically, the proximal end portion 84 has a portion projecting upward, in which the first upper coupling portion 81 and the insertion hole 84a are formed. The upper side of the insertion hole 84a is connected to the inside of the rear covering 32. As shown in FIG. 8, the insertion hole 84a is a through hole for having the radar harness 61 and the lamp harness 48 inserted therethrough.

The radar arrangement portion 85, which is a portion closer to the stay distal side than the proximal end portion 84, is a portion for having the sensor 60 disposed therein. The radar arrangement portion 85 has a radar support surface 85a, an insertion hole 85b, a radar attachment surface 85c, and a slope surface 85d.

The radar support surface 85a is a surface that supports the sensor 60 by abutting against the lower surface of the sensor 60. The insertion hole 85b is formed in the radar support surface 85a. The insertion hole 85b is a through hole for having the radar harness 61 inserted therethrough. To be specific, the radar harness 61 is connected to the lower surface of the sensor 60, and extends downward through the insertion hole 85b. As shown in FIG. 8, the radar harness 61 extends in the auxiliary space 113 which is disposed on the lower side of the stay main body 80, and passes through the insertion hole 84a, to reach the inside of the rear covering 32.

In the insertion hole 85b, a closing member may be disposed for waterproof and dustproof (hereinafter, simply described as waterproof) purposes. The closing member is, for example, a sponge provided with a through hole having a diameter equal to or smaller than that of the radar harness 61. The closing member, whose outer shape is smaller than the insertion hole 85b, is positioned in the insertion hole 85b while being compressed. In this manner, the closing member prevents or suppresses water from passing through the insertion hole 85b while allowing the radar harness 61 to pass through the insertion hole 85b.

The radar attachment surface 85c is a surface to which an attachment surface of the sensor 60 (the surface opposite to a surface for transmitting electromagnetic waves) is to be attached. The sensor 60 is attached via an orientation adjustment mechanism. The orientation adjustment mechanism is a mechanism for adjusting a first rotation angle, which is an angle of rotation about the up-down direction, and a second rotation angle, which is an angle of rotation about the left-right direction, for example. The slope surface 85*d* is formed on the stay distal side relative to the radar support surface 85*a*. The slope surface 85*d* is a surface that slopes downward toward the rear. Electromagnetic waves emitted from the sensor 60 spread downward, too (e.g., FIG. 4). Accordingly, due to the presence of the slope surface 85*d*, transmission of the electromagnetic waves is not hindered.

The sealing member arrangement portion 86 is a portion arranged so as to surround the radar arrangement portion 85. The sealing member arrangement portion 86 includes a placement surface on which the sealing member 49 is disposed. The upper covering 70 has, on its lower surface side, a contact surface whose shape corresponds to the sealing member arrangement portion 86. With this configuration, the sealing member 49 pinched between the contact surface of the upper covering 70 and the sealing member arrangement portion 86 of the stay main body 80 is deformed to waterproof the internal space 111.

If the insertion hole 85*b* is waterproofed by the closing member as mentioned above, the internal space 111 has a further stronger waterproofness. Since the second upper coupling portion 82 is disposed near the sealing member arrangement portion 86, the waterproofness can be increased as compared to, for example, a configuration having only the first upper coupling portion 81 and the third upper coupling portion 83. Especially, the first upper coupling portion 81 and the second upper coupling portion 82 have different coupling directions, which makes it less likely that a gap is formed between the upper covering 70 and the stay main body 80. As a result, the waterproofness can be further increased.

In the second embodiment, a member (e.g., the lamp harness 48 and the radar harness 61) disposed in the auxiliary space 113 has a waterproofness. The sealing member 49 does not waterproof the lamp arrangement portion 87, therefore. This allows the sealing member 49 to have a reduced size, so that a gap is not easily produced. Accordingly, the waterproofness can be increased. Here, it may be possible that the sealing member 49 waterproofs the lamp arrangement portion 87.

The lamp arrangement portion 87 is disposed on the stay rear end side relative to the radar arrangement portion 85. The lamp arrangement portion 87 is a portion for arrangement of the rear turn lamps 42 and the license lamp 46. Support mechanisms for these lamps, etc. are disposed in the lamp arrangement portion 87. The lamp arrangement portion 87 has a recessed portion for providing a space where these support mechanisms are to be disposed. The lamp arrangement portion 87 also has an insertion hole 87*a*. The insertion hole 87*a* is a through hole for having the lamp harness 48 inserted therethrough. More specifically, the lamp harness 48 passes through the insertion hole 87*a* toward the lower side of the stay main body 80. Then, as shown in FIG. 8, the lamp harness 48 extending in the auxiliary space 113 which is disposed on the lower side of the stay main body 80 passes through the insertion hole 84*a*, to reach the inside of the rear covering 32. The lamp harness 48 may be bundled together with the radar harness 61.

Figure 8:
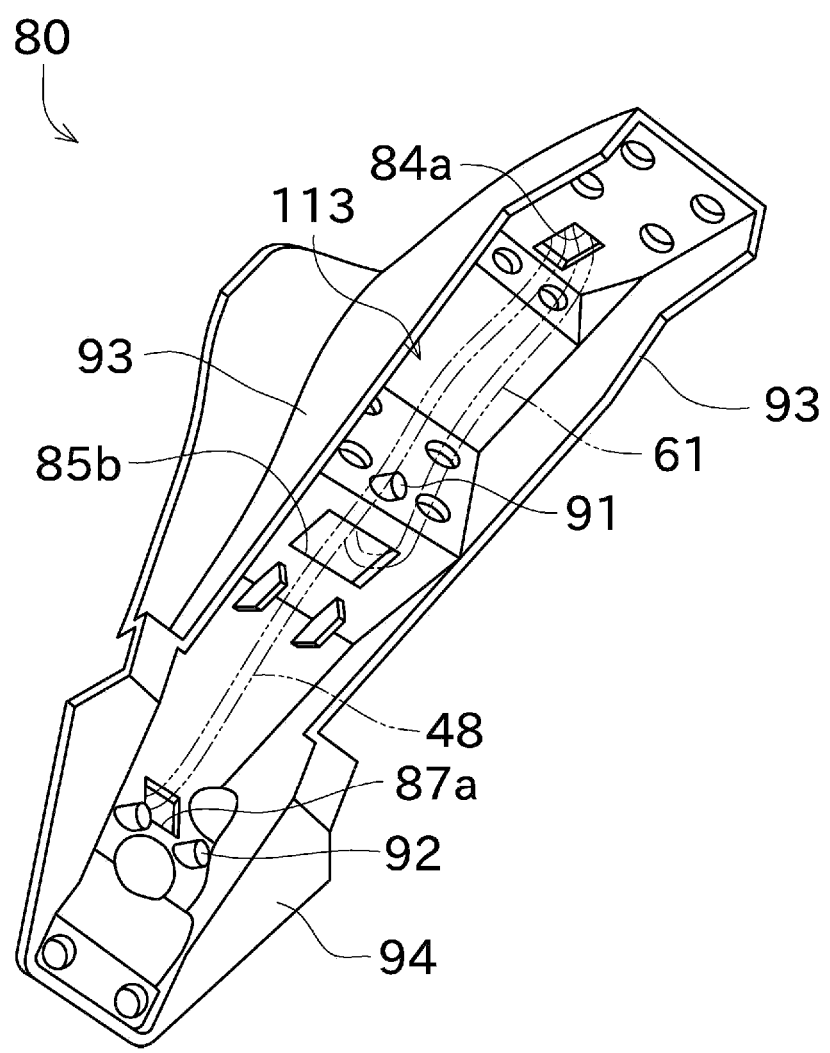
FIG. 8 shows a perspective view showing the lower side of the stay main body according to the second embodiment.

As shown in FIG. 8, the stay main body 80 further has, on its lower surface side, a first lower coupling portion 91, a second lower coupling portion 92, a rib 93, and a reinforcing piece 94.

The first lower coupling portion 91 is formed at a portion corresponding to the radar arrangement portion 85 (radar attachment surface 85*c*). The second lower coupling portion 92 is formed at a portion corresponding to the lamp arrangement portion 87. The first lower coupling portion 91 and the second lower coupling portion 92 are portions for attaching the lower covering 100. It is preferable that the lower covering 100, like the upper covering 70, is coupled by a coupling structure in a detachable manner. It may be possible that another coupling portion is formed on the stay proximal side relative to the first lower coupling portion 91.

The rib 93 is formed along the stay longer-side direction. The rib 93 is a plate-shaped portion projecting downward. The stay main body 80 has two ribs 93. The two ribs 93 function as side walls that partition the auxiliary space 113 from the outside. The ribs 93 also have a function for increasing the rigidity of the stay main body 80.

Since the stay main body 80 is produced by using a mold, there is a possibility that a sink mark is generated on a surface (upper surface) opposite to a portion having the ribs 93. In this respect, however, a portion where a sink mark may possibly be generated is covered with the upper covering 70, which makes the sink mark less conspicuous. Generally in a production process using a mold, the thickness of a rib is sometimes not constant but decreased toward the distal end, for the facilitation of die-cutting. In the second embodiment, the rib 93 is given a constant thickness, for providing a strength. There are various methods for molding the rib 93. Examples of the methods include a method using an elastic deformation of a resin for die-cutting, and a method using a sliding die in addition to ordinary two directional dies.

The surfaces (outer surfaces) of the ribs 93 facing the outside in the vehicle width direction are exposed to the outside. The surfaces (inner surfaces) opposite to the outer surfaces are covered with the lower covering 100, and thus are not exposed to the outside. This is why the outer surfaces of the ribs 93 are embossed (for example, textured) while the inner surfaces of the ribs 93 are not embossed. There are various methods for the embossing. Examples of the methods include a method in which embossing is performed concurrently with molding. In this case, a sliding die as mentioned above can be used for the facilitation of die-cutting.

The reinforcing piece 94 is portions that are connected to end portions of the ribs 93 on the stay distal side, and that are flared wider in the vehicle width direction than the ribs 93. The thickness direction of the reinforcing piece 94 is a direction different from the thickness direction of the rib 93. Due to the presence of the reinforcing piece 94, the stay main body 80 has an increased strength.

The lower covering 100 will now be described with reference to FIG. 9.

The lower covering 100 is not required to have a high rigidity, because the stay main body 80 is made of a material having a high rigidity as mentioned above. The lower covering 100, therefore, is made of the same material as the upper covering 70. A combination of the materials of the upper covering 70, the stay main body 80, and the lower covering 100 is not limited to the one illustrated in the second embodiment.

Figure 9:
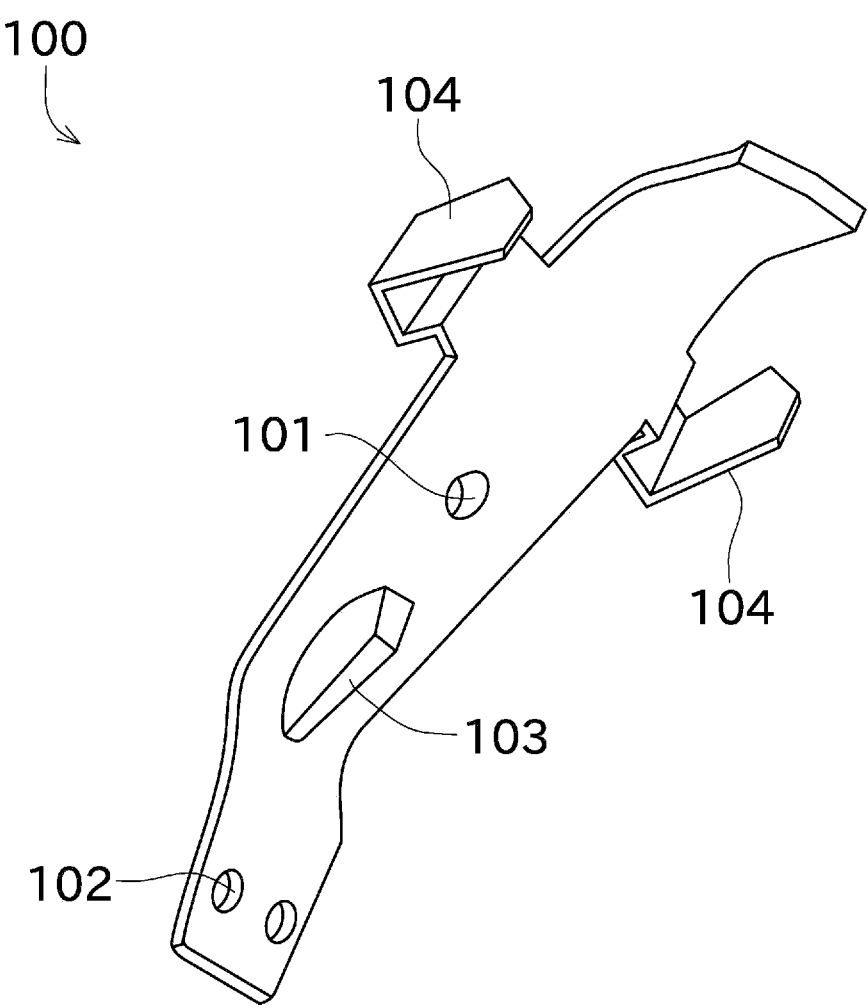
FIG. 9 shows a perspective view of a lower covering according to the second embodiment.

As shown in FIG. 9, the lower covering 100 has a first coupling portion 101, a second coupling portion 102, a harness arrangement portion 103, and side reflector attachment portions 104.

The first coupling portion 101 is a portion to be coupled to the first lower coupling portion 91. The second coupling portion 102 is a portion to be coupled to the second lower coupling portion 92. If there is another coupling portion formed on the stay proximal side relative to the first lower coupling portion 91, the lower covering 100 is provided with an additional coupling portion at a position corresponding to the other coupling portion.

As mentioned above, the auxiliary space 113 is not waterproofed. Thus, water having entered the auxiliary space 113 is discharged through a drain hole. The drain hole is a gap between the stay main body 80 and the lower covering 100. To be specific, the gap is formed between an end portion of the lower covering 100 on the stay distal side and a portion of a back surface of the stay main body 80 corresponding the end portion of the lower covering 100. Since the drain hole is provided at the lowermost position in the auxiliary space 113, accumulation of water is less likely to occur. Alternatively, the lower covering 100 may have a through hole that is used as the drain hole.

The harness arrangement portion 103 is a portion projecting downward for locally expanding the auxiliary space 113. This allows the lamp harness 48 to be arranged without the need of forcible bending. The side reflector attachment portions 104 are portions for attaching side reflectors 43. Specifically, the side reflector attachment portions 104 are flat surfaces to which the side reflectors 43 are to be attached. The side reflector attachment portions 104 are provided via connecting portions that expand in the vehicle width direction. This configuration makes the side reflector attachment portions 104 located outward of the auxiliary space 113 even while the lower covering 100 is coupled to the stay main body 80.

The configurations of the upper covering 70, the stay main body 80, and the lower covering 100 according to the second embodiment are merely an example. Configurations different from the above-described ones can be adopted. The difference is, for example, in the presence or absence and the positions of the coupling portions and the attachment portions, etc.

Figure 10:
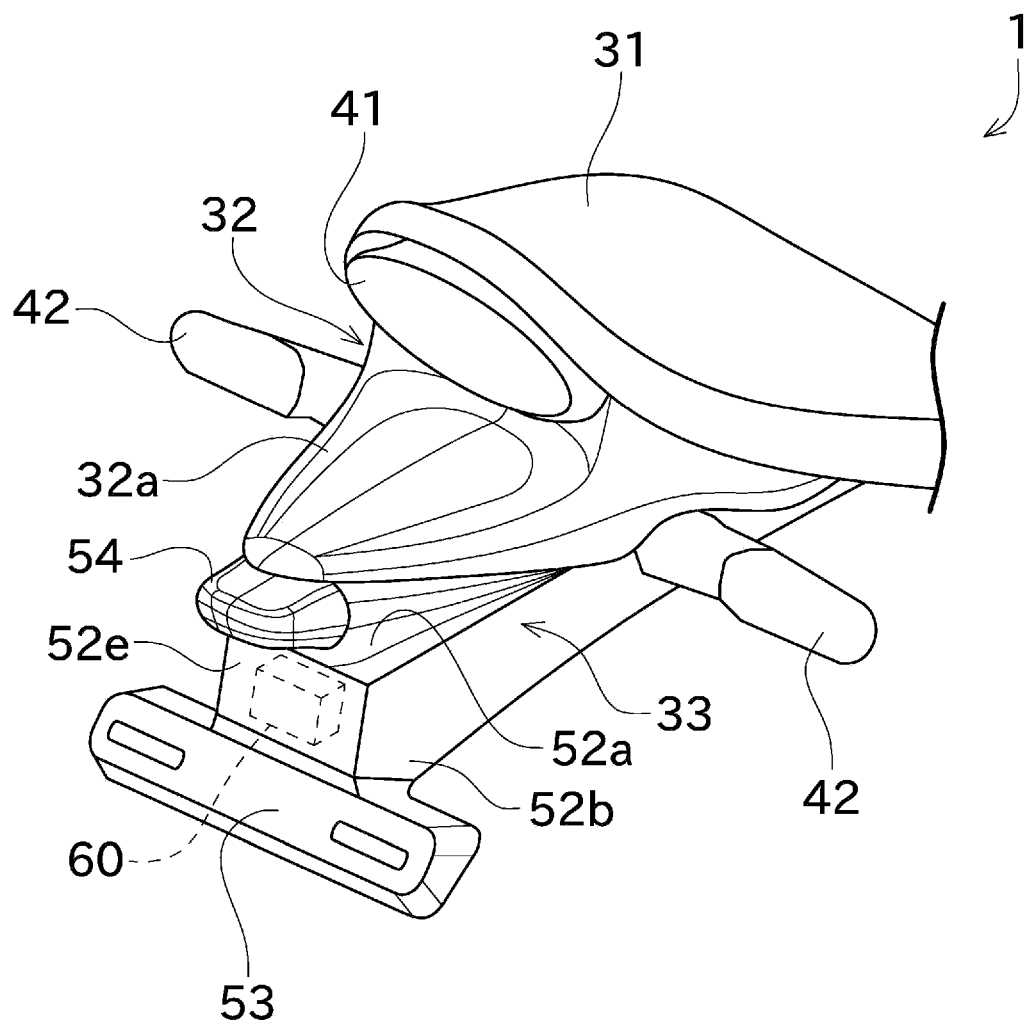
FIG. 10 shows a perspective view showing a rear part of a motorcycle according to a third embodiment of the present invention.
Figure 11:
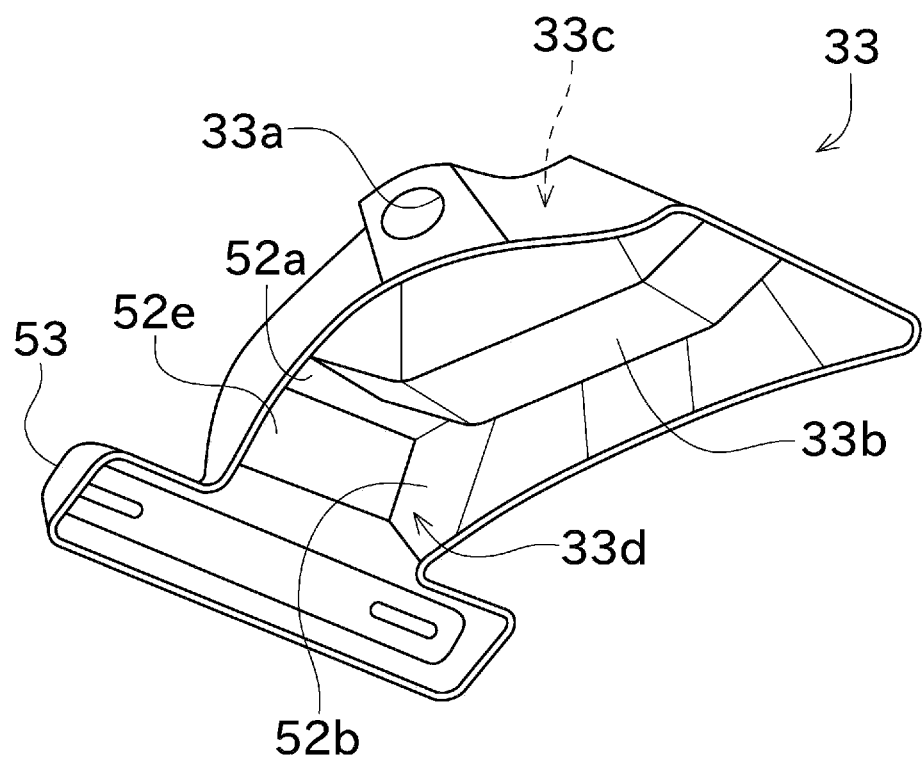
FIG. 11 shows a perspective view of a rear stay according to the third embodiment, as viewed from the lower side.
Figure 12:
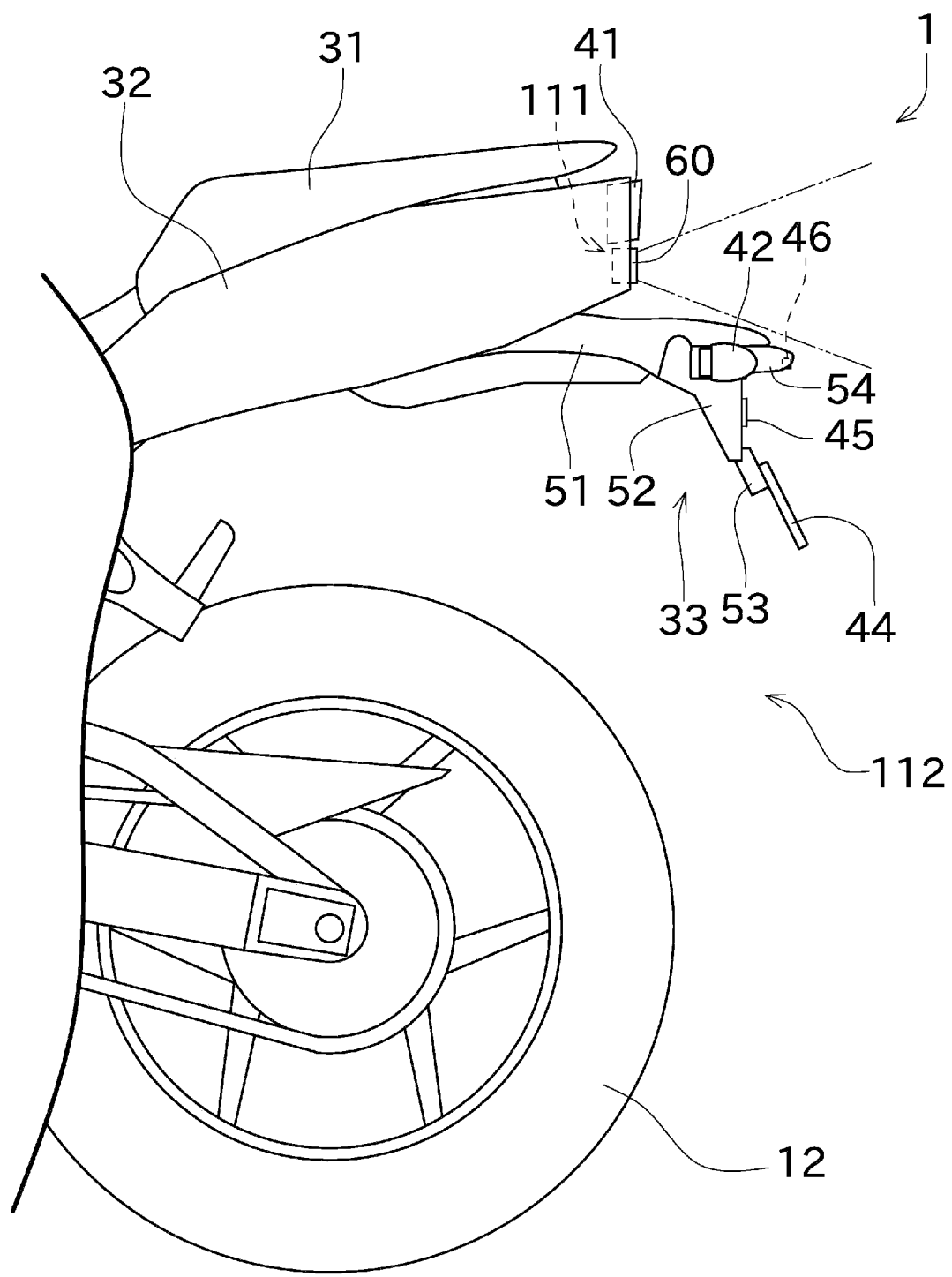
FIG. 12 shows an enlarged side view of a motorcycle according to a fourth embodiment according to the present invention.
Figure 13:
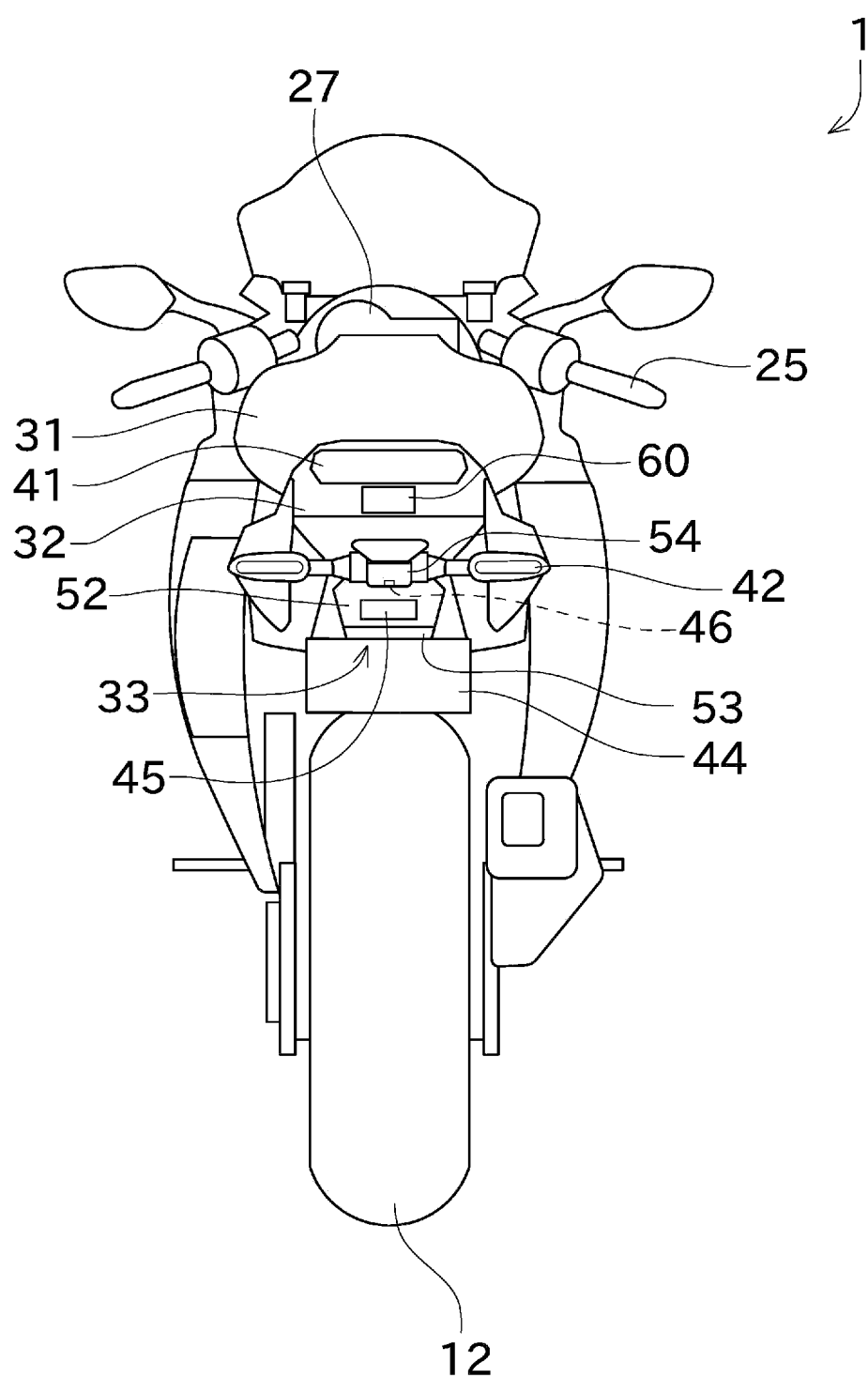
FIG. 13 shows a rear view of the motorcycle according to the fourth embodiment.
Figure 14:
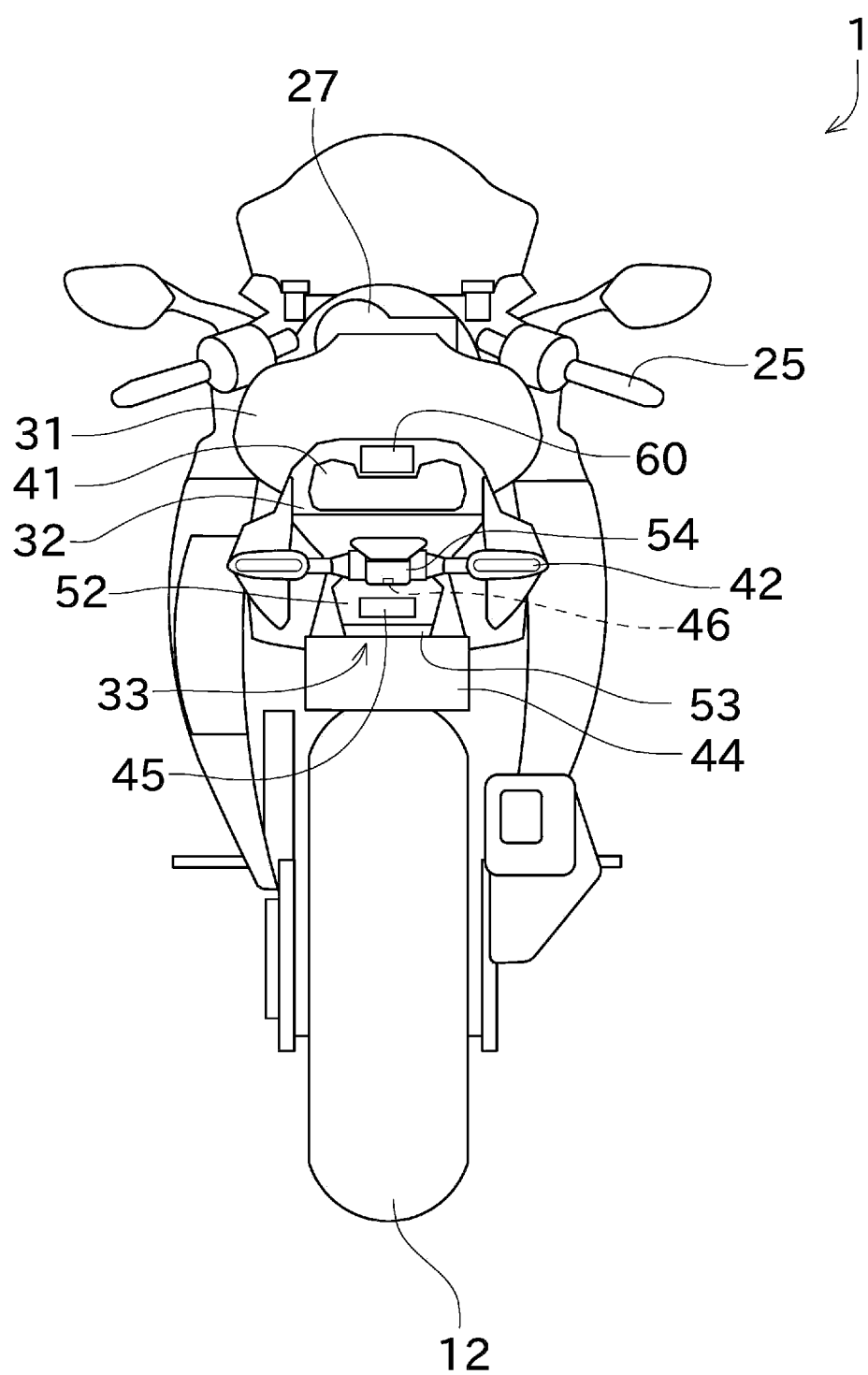
FIG. 14 shows a rear view of a motorcycle according to a fifth embodiment according to the present invention.
Figure 15:
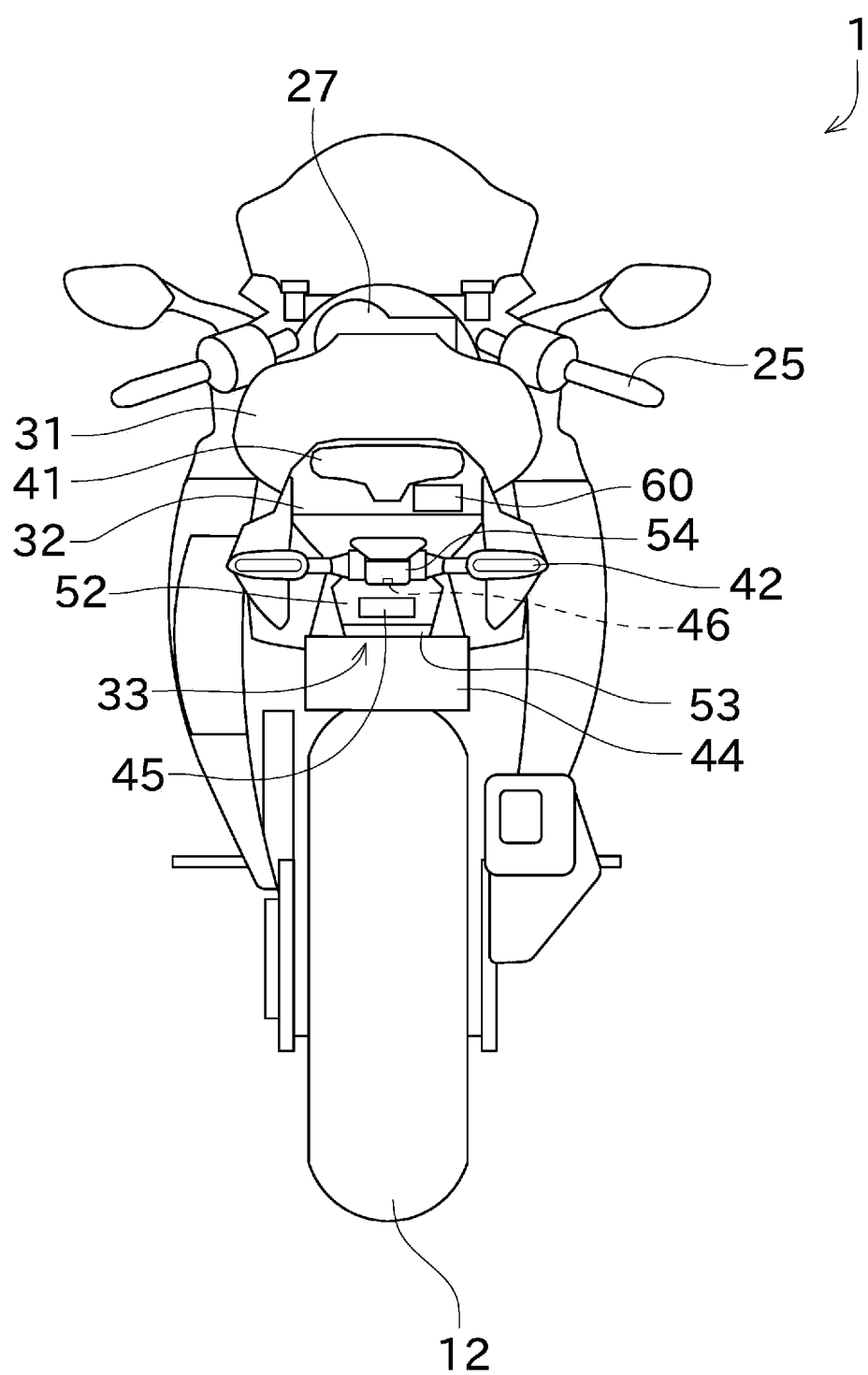
FIG. 15 shows a rear view of a motorcycle according to a sixth embodiment according to the present invention.

A third embodiment will now be described with reference to FIG. 10 and FIG. 11.

In the first embodiment described above, the tail lamp 41 is disposed at the rear end of the rear covering 32 such that the tail lamp 41 projects rearward from the rear end. In the third embodiment, a covering rear end portion 32a, which is a part of the rear covering 32, is disposed below the tail lamp 41 and more rearward than the tail lamp 41.

In the first embodiment, the rear turn lamps 42 are disposed more rearward than the tail lamp 41. In the third embodiment, the tail lamp 41 and the rear turn lamps 42 are disposed such that their positions in the front-rear direction overlap each other.

In the third embodiment, like in the first embodiment, various components including the rear end components are attached to the rear stay 33. The rear stay 33 also functions as a rear fender. Received inside the rear stay 33 is the sensor 60. The rear stay 33 of the third embodiment has the top wall 52a, the pair of left and right side walls 52b, and the rear wall 52e. The lower wall 52c and the front wall 52d can also be formed by additionally arranging another member.

The rear stay 33 of the third embodiment has through holes 33a, a recessed portion 33b, an upper space 33c, and a lower space 33d. The through holes 33a are formed in side surfaces of the rear stay 33. The through holes 33a are holes for having support bodies of the rear turn lamps 42 inserted therethrough. The recessed portion 33b is a portion of the upper surface of the rear stay 33, the portion being recessed downward. Formed above the recessed portion 33b is the upper space 33c. The upper side of the upper space 33c is closed by the rear covering 32 (covering rear end portion 32a). The lower space 33d is a space provided below the upper surface of the rear stay 33.

The lower space 33d corresponds to the "internal space", and the sensor 60 is disposed in the lower space 33d. Electric wires connected to the tail lamp 41 and the rear turn lamps 42 are arranged so as to extend through the upper space 33c. An electric wire connected to the sensor 60 may be arranged so as to extend through the lower space 33d. Alternatively, the upper surface of the rear stay 33 may have a through hole through which the electric wire connected to the sensor 60 is guided from the lower space 33d to the upper space 33c. In such a configuration, a route along which the electric wire connected to the sensor 60 is arranged is partially shared with the electric wires connected to the rear turn lamps 42 and the license lamp 46.

Fourth to sixth embodiments will now be described with reference to FIG. 12 to FIG. 15.

In the first and third embodiments, the sensor 60 is received in the rear stay 33, but in the fourth to sixth embodiments, the sensor 60 is received in a rear portion of the rear covering 32. Thus, the internal space 111 is provided in the rear portion of the rear covering 32. Like in the first and third embodiments, the rear covering 32 has wall portions each covering each of the five surfaces excluding the rear surface of the sensor 60 having a rectangular parallelepiped shape. The rear covering 32 may have a rear wall that covers the rear surface of the sensor 60.

The tail lamp 41 as well as the sensor 60 is disposed in the rear portion of the rear covering 32. The rear surface of the sensor 60 is substantially flush with the rear surface of the tail lamp 41. Here, a state of being substantially flush is obtained when the two rear surfaces (rear end surfaces) are at close positions (especially in the front-rear direction) and additionally the two rear surfaces extend in close directions. Complete coincidence of the positions and the directions is not always necessary. Thus, the positions of the two rear surfaces can be slightly different from each other, and the directions of the two rear surfaces can be slightly different from each other. In some cases, the rear surface of the tail lamp 41 includes two or more surfaces. It is only required that one surface or principal surfaces of the two or more surfaces is/are substantially flush. In other words, the position of the rear end of the sensor 60 is substantially the same as the position of the rear end of the tail lamp 41. In the fourth to sixth embodiments, a region between the license lamp 46 and the license plate 44 is vacant, and therefore the rear reflector 45 is disposed in this region.

The fourth to sixth embodiments are different from one another in the shapes of the tail lamp 41 and the sensor 60 in a rear view, and positional relationship between them in a rear view. In the following, the fourth to sixth embodiments will be described separately. In the fourth embodiment (FIG. 12 and FIG. 13), the sensor 60 is disposed below and adjacent to the tail lamp 41. Being adjacent means that an interval between the tail lamp 41 and the sensor 60 is narrow relative to their sizes. The tail lamp 41 has a substantially rectangular shape in a rear view, and in other words, at least a lower part of its contour is linear. The sensor 60 also has a substantially rectangular shape in a rear view, and at least an upper part of its contour is linear. The tail lamp 41 and the sensor 60 are arranged such that the lower part of the contour of the tail lamp 41 and the upper part of the contour of the sensor 60 are in parallel to each other. This allows an effective use of a region (especially a length in the up-down direction) in the rear portion of the rear covering 32. In the fourth embodiment, the tail lamp 41 is not disposed on both sides of the sensor 60 in the vehicle width direction. In a rear view, therefore, only one of the four sides of the sensor 60 is adjacent to the tail lamp 41. In other words, the sensor 60 and the tail lamp 41 are adjacent to each other in a rear view, are adjacent to each other in a side view, and overlap each other in a plan view.

In the fifth embodiment (FIG. 14), the sensor 60 is disposed above and adjacent to the tail lamp 41. The shape of the tail lamp 41 in a rear view is basically a substantially rectangular shape, and its both ends in the vehicle width direction project upward. An upper part of the contour of the tail lamp 41 has a linear portion in its middle region with respect to the vehicle width direction. The tail lamp 41 and the sensor 60 are arranged such that the upper part of the contour of the tail lamp 41 and a lower part of the contour of the sensor 60 are in parallel to each other. In addition, the sensor 60 is disposed so as to be interposed between the portions of the tail lamp 41 projecting upward. In a rear view, therefore, three of the four sides of the sensor 60 are adjacent to the tail lamp 41. In other words, the sensor 60 and the tail lamp 41 are adjacent to each other in a rear view, overlap each other in a side view, and overlap each other in a plan view.

In the sixth embodiment (FIG. 15), the sensor 60 is disposed obliquely right-below and adjacent to the tail lamp 41. The shape of the tail lamp 41 in a rear view is basically a substantially rectangular shape, and its middle portion in the vehicle width direction projects downward. In the sixth embodiment, the contour of the tail lamp 41 and the contour of the sensor 60 are not in parallel to each other, but are adjacent to each other because of a short distance between them. To be specific, the sensor 60 is arranged on the right side of a downward-projecting portion of the tail lamp 41. In a rear view, therefore, two of the four sides of the sensor 60 are adjacent to the tail lamp 41. In other words, the sensor 60 and the tail lamp 41 are adjacent to each other in a rear view, overlap each other in a side view, and overlap each other in a plan view.

In a case of arranging the sensor 60 in the rear covering 32 as illustrated in the fourth to sixth embodiments, the sensor 60 is preferably arranged at a high position, in order to reduce interference between the sensing range of the sensor 60 and the rear stay 33. It therefore is preferable that the sensor 60 is arranged such that its upper end is positioned higher than the upper end of the tail lamp 41, as illustrated in the fifth embodiment for example. Since the rear covering 32 is harder to bend than the rear stay 33, a change of the position of the sensor 60 due to bending can be suppressed.

Any of the above-described embodiments, such as the fourth to sixth embodiments, can be combined appropriately. For example, the shape of the tail lamp 41 according to the fifth embodiment, which is a shape having end portions in the vehicle width direction projecting in the up-down direction, is applicable to the tail lamp 41 of the fourth embodiment. The shape according to the sixth embodiment, which is a shape having a middle portion in the vehicle width direction projecting in the up-down direction, is applicable to the tail lamp 41 of the fourth embodiment. The features of the first or third embodiment can be combined with any of the fourth to sixth embodiments. For example, the presence of the rear wall 52*e*, which is a feature of the first and third embodiments, is applicable to the motorcycle 1 according to any of the fourth to sixth embodiments.

The shape of the tail lamp 41 and the position of the sensor 60 illustrated in each of the fourth to sixth embodiments are just examples, and can be changed. For example, it may be possible that the tail lamp 41 has a surrounding shape (such as a ring-like shape, a circular shape, an elliptical shape, a square frame shape, a triangular frame shape, or a polygonal frame shape), and the sensor 60 is disposed in a space within a region surrounded by the tail lamp 41. In other words, the tail lamp 41 may be arranged so as to surround the sensor 60 having a rectangular shape (so as to be adjacent to all of the four sides of the sensor 60). It may also be possible that the tail lamp 41 has a U-like shape or a V-like shape, and the sensor 60 is disposed in a space within the U-like or V-like shape.

As thus far described, the motorcycle 1 according to the foregoing embodiment includes the tail lamp 41, the rear covering 32, the rear end components (the license plate 44, the rear reflector 45, the license lamp 46), the rear stay 33, and the sensor 60. The tail lamp 41 emits light toward the rear side. The rear covering 32 is provided with the tail lamp 41. The rear end components are disposed more rearward than the rear covering 32. The rear stay 33 extends at least rearward from the connecting portion connected to the rear covering 32, and supports the rear end components. The sensor 60 is at least partially received in the internal space 111 formed in the rear covering 32 or in the rear stay 33, and senses an object rearward.

Since the sensor 60 is received in the internal space 111 of the rear covering 32 or of the rear stay 33, upsizing of the vehicle body can be prevented or reduced as compared to the sensor 60 being attached to the outside of an exterior component such as the rear covering 32 and the rear stay 33.

The motorcycle 1 according to the foregoing embodiment includes the pair of left and right rear turn lamps 42. The single sensor 60 senses a range from the left rear side to the right rear side. The sensor 60 is at least partially positioned closer to the center in the vehicle width direction than the left rear turn lamp 42, and closer to the center in the vehicle width direction than the right rear turn lamp 42.

In this manner, positioning the sensor 60 closer to the center in the vehicle width direction allows the single sensor 60 to perform well-balanced sensing over the range from the left rear side to the right rear side. Moreover, a reduced space is occupied by the sensor 60, as compared to a configuration having left and right sensors 60 arranged side by side.

In the motorcycle 1 according to the foregoing embodiment, the sensor 60 is at least partially received in the internal space 111 formed in the rear stay 33. The sensor 60 is disposed at a position closer to the connecting portion than the rear end components.

The sensor 60 is disposed at a position in the rear stay 33, the position being closer to the connecting portion (that is, relatively close to the proximal side of the rear stay 33) than the rear end components. This can reduce the degree to which the position of the sensor 60 is changed by vibration. In addition, the sensor 60 is at least partially received not in the rear covering 32 but in the rear stay 33. This makes it possible to set a layout of the sensor 60 without considering positional interference with the tail lamp 41.

In the motorcycle 1 according to the foregoing embodiment, the rear stay 33 includes the stay main body 80 and the upper covering 70. The sensor 60 is attached to the stay main body 80. The upper covering 70 is disposed so as to cover at least a part of the upper surface of the stay main body 80, the part corresponding to a range where the sensor 60 is attached.

This can protect the sensor 60 from flying objects, etc.

In the motorcycle 1 according to the foregoing embodiment, the rear stay 33 further includes the sealing member 49. The sealing member 49 is disposed between the stay main body 80 and the upper covering 70, and seals at least a part of the space between the stay main body 80 and the upper covering 70.

This can protect the sensor 60 also from water and dust, etc.

In the motorcycle 1 according to the foregoing embodiment, the rear stay 33 further includes the lower covering 100 that is disposed so as to cover at least a part of the lower surface of the stay main body 80. The stay main body 80 has the insertion hole 85b for having the radar harness 61 connected to the sensor 60 pass therethrough. Via the insertion hole 85b, the radar harness 61 connected to the sensor 60 passes through the auxiliary space 113 which is a space between the stay main body 80 and the lower covering 100.

Accordingly, the space (internal space 111) where the sensor 60 is positioned can be separated from the space (auxiliary space 113) where the radar harness 61 is positioned. This can prevent or suppress a situation where sensing by the sensor 60 is obstructed by the radar harness 61.

In the motorcycle 1 according to the foregoing embodiment, the rear end components are lamps (the rear turn lamps 42 and the license lamp 46) that emit light. The lamp harness 48 connected to the lamps passes through the auxiliary space 113 between the stay main body 80 and the lower covering 100.

Accordingly, the radar harness 61 and the lamp harness 48 can be handled collectively, which allows an effective use of the space in the rear stay 33. In addition, a work of arranging the harnesses can be made easy.

In the motorcycle 1 according to the foregoing embodiment, the rear stay 33 includes the stay extending-out portion 51 and the stay rear end portion 52. The stay extending-out portion 51 extends at least rearward from the connecting portion connected to the rear covering 32. The stay rear end portion 52 extends at least downward from the rear end portion of the stay extending-out portion 51, and supports the rear end components. The sensor 60 is received in the internal space 111 that is formed either in the rear covering 32 or in the stay rear end portion 52 excluding the stay extending-out portion 51.

This allows the sensor 60 to be disposed in a rear portion of the motorcycle 1 without increasing the dimension of the stay extending-out portion 51 in the up-down direction.

In the motorcycle 1 according to the foregoing embodiment, the sensor 60 is received in the stay rear end portion 52.

As the sensor 60 can be disposed relatively rearward, the number of other components disposed more rearward than the sensor 60 is reduced. Accordingly, the sensor 60 can detect an object with an enhanced accuracy.

In the motorcycle 1 according to the foregoing embodiment, the rear stay 33 includes the license plate attachment portion 53 to which the license plate 44 can be attached. The sensor 60 is disposed upper than the license plate attachment portion 53, and lower than the license lamp 46 for illuminating the license plate 44.

Accordingly, the radar device can be arranged with effective use of a space formed between the license plate 44 and the license lamp 46.

In the motorcycle 1 according to the foregoing embodiment, the rear stay 33 has the projecting portion (the license plate attachment portion 53, the license lamp attachment portion 54) projecting more rearward than the rear surface of the sensor 60.

Accordingly, as an object coming rearward becomes relatively close to the vehicle body 10, the object is contacted by the projecting portion before the object is contacted by the sensor 60. Thus, contact collision between the sensor 60 and the object can be reduced, so that a damage to the sensor 60 can be suppressed.

In the motorcycle 1 according to the foregoing embodiment, the stay rear end portion 52 has the rear wall 52e, the side walls 52b formed on both sides in the vehicle width direction, and the top wall 52a, which define the box-shaped (rectangular parallelepiped) internal space 111 in which the sensor 60 is received.

Accordingly, the stay rear end portion 52 can constitute at least a part of a casing in which the sensor 60 is received, which can reduce the number of component parts while increasing the rigidity of a portion that supports the sensor 60.

In the motorcycle 1 according to the foregoing embodiment, the stay rear end portion 52 further includes the lower wall 52c that partitions the lower space in which the rear wheel 12 is disposed from the internal space 111 in which the sensor 60 is received.

This can prevent or reduce a situation where the rear wheel 12 splashes up mud onto the sensor 60.

In the motorcycle 1 according to the foregoing embodiment, the rear stay 33 is attachable to and detachable from the connecting portion connected to the rear covering 32. The sensor 60 is received in the internal space 111 that is formed in the rear stay 33.

This makes it possible that the shape of the rear covering 32 is standardized irrespective of whether or not the sensor 60 is disposed. Accordingly, the number of component parts can be reduced, and thus cost reduction can be obtained easily.

In the motorcycle 1 according to the foregoing embodiment, the sensor 60 is attached to the rear portion of the rear covering 32. In a rear view, the sensor 60 and the tail lamp 41 are adjacent to each other. In a side view, the sensor 60 and the tail lamp 41 are adjacent to or overlap each other.

In general, it is preferable that a member that intercepts light is not arranged on the rear side of the tail lamp 41, and it is preferable that a member that hinders sensing is not arranged on the rear side of the sensor 60. Furthermore, it is preferable that the tail lamp 41 is arranged at such a position that the tail lamp 41 is easily visible from a vehicle behind, and it is preferable that the sensor 60 is arranged at such a position that the sensor 60 can easily sense an object. In this manner, the tail lamp 41 and the sensor 60 have a required condition in common with each other. Accordingly, a favorable layout can be obtained by arranging them adjacent to each other.

In the motorcycle 1 according to the foregoing embodiment, the rear surface of the tail lamp 41 is substantially flush with the rear surface of the sensor 60.

This can prevent or reduce a situation where the tail lamp 41 hinders sensing by the sensor 60, while preventing or reducing a situation where the tail lamp 41 is hidden by the sensor 60.

The motorcycle 1 according to the foregoing embodiment has the following configurations and advantageous effects.

In the motorcycle 1 according to the foregoing embodiment, the rear stay 33 is provided with the rear reflector 45 that reflects light emitted from the rear side, and the rear reflector 45 is disposed at a position lower than the license plate attachment portion 53.

If both the rear reflector 45 and the radar device are disposed between the license lamp 46 and the license plate 44, the distance between the license lamp 46 and the license plate 44 is increased. In this respect, the foregoing configuration in which the rear reflector 45 is disposed at a position lower than the license plate 44 can suppress an increase of the distance.

In the motorcycle 1 according to the foregoing embodiment, the rear stay 33 has a structure for making the sensor 60 supported by the rear covering 32, and the whole or the core of the structure is made of a metal.

With this configuration, the rear stay 33 is bent less easily as compared to a configuration in which the rear stay 33 is made of a general resin. Thus, the position and angle of the sensor 60 are not easily changed. Consequently, a deterioration in the sensing accuracy can be suppressed.

In the motorcycle 1 according to the foregoing embodiment, the sensor 60 (the radar device or the transmission axis of the sonar) is at a position in the rear stay 33, the position being lower than the center in the up-down direction of the region between the license lamp attachment portion 54 (the license lamp 46) and the license plate attachment portion 53 (the license plate 44).

This makes it less likely that the license lamp attachment portion 54 interferes with the sensing range of the sensor 60.

In the motorcycle 1 according to the second embodiment, the sensor 60 has a square or rectangular shape in a rear view, and only one of the four sides thereof is adjacent to the tail lamp 41.

Accordingly, it is not necessary that the contour of the tail lamp 41 is adapted to the sensor 60.

In the motorcycle 1 according to the second embodiment, the sensor 60 has a square or rectangular shape in a rear view, and two or more of the four sides thereof are adjacent to the tail lamp 41.

This allows effective use of a region in the rear portion of the rear covering 32. For example, even when the rear portion of the rear covering 32 has a small area, an area required by the legal regulations can be satisfied easily.

While some preferred embodiments of the present invention have been described above, the above-described configurations can be modified, for example, as follows.

In a rear view, the sensor 60, which has a rectangular shape in the foregoing embodiments, may have a square shape. Two or more sensors 60 (for example, a pair of left and right sensors 60) may be arranged.

The features related to the layout of the sensor 60, etc. described in the foregoing embodiments are applicable to various types of motorcycles including naked types, off-road types, super-sport types, touring types, cruiser types, scooter types, and the like. The present invention is applicable not only to motorcycles but also to any straddle vehicles. Straddle vehicles, aside from motorcycles, to which the present invention is applicable include a vehicle having two front wheels and one rear wheel, a vehicle having one front wheel and two rear wheels, and a vehicle having two front wheels and two rear wheels, for example.

The straddle vehicle refers to a vehicle of a type in which a seat is disposed at the center in the vehicle width direction, and on which the driver rides while straddling the seat. The straddle vehicle has a knee grip portion, for example. The knee grip portion, which is formed frontward of the seat, is a portion to be sandwiched by knee portions of the driver from the outside in the vehicle width direction. In the motorcycle 1 according to the embodiment, a rear portion of the fuel tank 28 and therebelow correspond to the knee grip portion. The straddle vehicle may have a step floor instead of the knee grip portion. The step floor, which is formed frontward of the seat, is a portion on which the driver places his/her feet. Formed above the step floor is a space in which the legs of the driver are placed.

The rear end components described in the foregoing embodiment are merely an example. The rear end components can be partially omitted, or other rear end components may be additionally provided.

In the foregoing embodiments (except the second embodiment), the rear stay 33 is composed of a single member, and the sensor 60 is received in the internal space 111 of the rear stay 33. Alternatively, the rear stay 33 may have the stay extending-out portion 51 and the stay rear end portion 52 as separate members. In another example, the stay rear end portion 52 may be larger in the vehicle width direction than the stay extending-out portion 51. This allows the stay rear end portion 52 to function as a flap that serves as a mudguard of the vehicle body 10, too. The stay extending-out portion 51 preferably has a high rigidity, in order to support the flap (the stay rear end portion 52) and the rear end components. For this purpose, for example, the stay extending-out portion 51 is made of a material, such as a metal material, having a higher rigidity than the flap. For example, the stay extending-out portion 51 may have a rib for providing a higher rigidity in the up-down direction than the flap, or may have a cross-sectional shape adapted to increase the rigidity in the up-down direction. The stay rear end portion 52, on the other hand, is preferably made of a resin material, for the purpose of weight reduction. In still another example, a part of the stay extending-out portion 51 is disposed in the internal space 111 of the flap. The sensor 60 is supported by the part of the stay extending-out portion 51 received in the internal space 111 of the flap. This can provide a higher supporting rigidity as compared to when the sensor 60 is supported by the flap.

The foregoing embodiments illustrate the sensor 60 having the sensor part and the processing part integrated as a single unit, but they may be separate parts. In such a configuration, the processing part may be disposed more frontward than the internal space 111, for example. The sensor 60 may be a unit including two or more sensor parts. In such a configuration, it is preferable that the two or more sensor parts are disposed at the center in the vehicle width direction while being arranged one above the other in the up-down direction, for example.

REFERENCE SIGNS LIST 1 motorcycle (straddle vehicle)
32 rear covering
33 rear stay
41 tail lamp
42 rear turn lamp
44 license plate (rear end component)
45 rear reflector (rear end component)
46 license lamp (rear end component)
51 stay extending-out portion
52 stay rear end portion
53 license plate attachment portion (projecting portion)
54 license lamp attachment portion (projecting portion)
60 sensor
79 upper covering
80 stay main body
100 lower covering

The invention claimed is:
1. A straddle vehicle, comprising:
a tail lamp emitting light toward a rear side;
a rear covering provided with the tail lamp;

a rear end component disposed more rearward than the rear covering;

a rear stay extending at least rearward from a connecting portion connected to the rear covering, the rear stay supporting the rear end component; and a sensor sensing an object rearward, the sensor being at least partially received in an internal space that is formed either in the rear covering or in the rear stay, wherein a lower side of the internal space is closed, wherein the sensor is at least partially received in the internal space formed in the rear stay and wherein the sensor is disposed at a position closer to the connecting portion than the rear end component, wherein the rear stay includes:
- a stay main body to which the sensor is attached; and
- an upper covering that is disposed so as to cover at least a part of an upper surface of the stay main body, the part corresponding to a range where the sensor is attached; and wherein the rear stay further includes a sealing member and wherein the sealing member is disposed between the stay main body and the upper covering, and seals at least a part of a space between the stay main body and the upper covering.

2. The straddle vehicle according to claim 1, wherein the rear stay includes:
- a stay extending-out portion that extends rearward from a connecting portion connected to the rear covering; and
- a stay rear end portion that extends downward from the rear end of the stay extending-out portion, and supports the rear end component, and wherein the sensor is received in the internal space that is formed either in the rear covering or in the stay rear end portion excluding the stay extending-out portion.

3. The straddle vehicle according to claim 2, wherein the sensor is received in the stay rear end portion.

4. The straddle vehicle according to claim 3, wherein the rear stay includes a license plate attachment portion to which a license plate can be attached and wherein the sensor is disposed upper than the license plate attachment portion, and lower than a license lamp for illuminating the license plate.

5. The straddle vehicle according to claim 2, wherein the stay rear end portion has a rear wall, side walls formed on both sides in a vehicle width direction, and a top wall and wherein the rear, side, and top walls defining an internal space in which the sensor is received.

6. The straddle vehicle according to claim 5, wherein the stay rear end portion further includes a lower wall that partitions a lower space in which a rear wheel is disposed from the internal space in which the sensor is received.

7. The straddle vehicle according to claim 2, wherein the rear stay has a projecting portion projecting more rearward than a rear surface of the sensor.

8. The straddle vehicle according to claim 1, wherein the sensor is attached to a rear portion of the rear covering, wherein, in a rear view, the sensor and the tail lamp are adjacent to each other, and wherein, in a side view, the sensor and the tail lamp are adjacent to or overlap each other.

9. The straddle vehicle according to claim 8, wherein a rear surface of the tail lamp is substantially flush with a rear surface of the sensor.

10. The straddle vehicle according to claim 1, further comprising:
- a pair of left and right rear turn lamps,
- wherein the sensor senses a range from a left rear side to a right rear side and wherein the sensor is at least partially positioned closer to the center in a vehicle width direction than the left rear turn lamp, and closer to the center in the vehicle width direction than the right rear turn lamp.

11. The straddle vehicle according to claim 1, wherein the rear stay is attachable to and detachable from the connecting portion connected to the rear covering and wherein the sensor is received in the internal space that is formed in the rear stay.

12. The straddle vehicle according to claim 1, wherein the rear stay includes an upper covering being disposed so as to cover an upper side of a range where the sensor is attached; and a lower covering being disposed so as to cover a lower side of the range where the sensor is attached and wherein the upper covering is detachable.

13. The straddle vehicle according to claim 1, wherein the rear stay includes a stay main body, an upper covering, and a lower covering and wherein the stay main body has a higher rigidity than the upper covering.

14. The straddle vehicle according to claim 1, wherein the sensor is disposed at a position close to a proximal side of the rear stay and wherein the rear stay extends obliquely lower rear side.

15. The straddle vehicle according to claim 1, wherein the rear stay includes:
- a stay extending-out portion extending rearward from a connecting portion connected to the rear covering; and
- a stay rear end portion extending downward from the rear end of the stay extending-out portion, and supports the rear end component and wherein the sensor is disposed closer to a proximal end relative to a midpoint between the proximal end and a distal end of the stay rear end portion.

16. The straddle vehicle according to claim 1, wherein the sensor is in a shape of a rectangular plate and wherein a dimension in a thickness direction extends in the front-rear direction.

17. The straddle vehicle according to claim 1, wherein the sensor is disposed frontward than a lamp disposed in the rear stay and wherein a lamp harness extending from the lamp toward a vehicle body is disposed in an auxiliary space which is a space different from the internal space.

18. The straddle vehicle according to claim 1, wherein the sensor is disposed so that a rear end of the sensor is frontward than a rear end of the rear stay and wherein the rear stay extends obliquely lower rear side.

19. A straddle vehicle, comprising:
- a tail lamp emitting light toward a rear side;
- a rear covering provided with the tail lamp;
- a rear end component disposed more rearward than the rear covering;
- a rear stay extending at least rearward from a connecting portion connected to the rear covering, the rear stay supporting the rear end component; and
- a sensor sensing an object rearward, the sensor being at least partially received in an internal space that is formed either in the rear covering or in the rear stay, wherein a lower side of the internal space is closed, wherein the sensor is at least partially received in the internal space formed in the rear stay and wherein the sensor is disposed at a position closer to the connecting portion than the rear end component, wherein the rear stay includes:
- a stay main body to which the sensor is attached; and an upper covering that is disposed so as to cover at least a part of an upper surface of the stay main body, the part corresponding to a range where the sensor is attached; and wherein the rear stay further includes a lower covering that is disposed so as to cover at least a part of a lower surface of the stay main body, wherein the stay main body has an insertion hole for having a harness connected to the sensor pass therethrough, and wherein, via the insertion hole, the harness connected to the sensor passes through a space between the stay main body and the lower covering.

20. The straddle vehicle according to claim 19, wherein the rear end component is a lamp that emits light and wherein a harness connected to the lamp passes through the space between the stay main body and the lower covering.

* * * * *